United States Patent [19]

Cramer, Sr.

[11] Patent Number: 4,553,402
[45] Date of Patent: Nov. 19, 1985

[54] NON-REVERSIBLE MULTIPLE-REFRIGERATION-CYCLE SOLAR APPARATUS INCLUDING A VARIABLE DIRECTING VALVE MECHANISM

[76] Inventor: Carl V. Cramer, Sr., Frable Rd., Brodheadsville, Pa. 18322

[21] Appl. No.: 486,783

[22] Filed: Apr. 19, 1983

Related U.S. Application Data

[63] Continuation of Ser. No. 329,256, Dec. 10, 1981, abandoned, which is a continuation of Ser. No. 79,786, Sep. 28, 1979, abandoned.

[51] Int. Cl.[4] .......................... A63C 19/10; F25B 13/00
[52] U.S. Cl. .................................. 62/235.1; 62/324.6; 62/238.6; 237/2 B
[58] Field of Search ............ 237/2 B; 62/235.1, 324.1, 62/324.6, 79, 238.6, 99

[56] References Cited

U.S. PATENT DOCUMENTS 4,313,314  2/1982  Boyanich ........................... 62/324.1
4,363,218  12/1982  Nussbaum .......................... 237/2 B Primary Examiner—Henry Bennett
Attorney, Agent, or Firm—Howard N. Sommers

[57] ABSTRACT

A non-reversible multiple-refrigeration-cycle solar apparatus, including a variable directing valve mechanism for conditioning a medium, defrosting the apparatus, and absorbing, storing and using solar energy.

16 Claims, 18 Drawing Figures

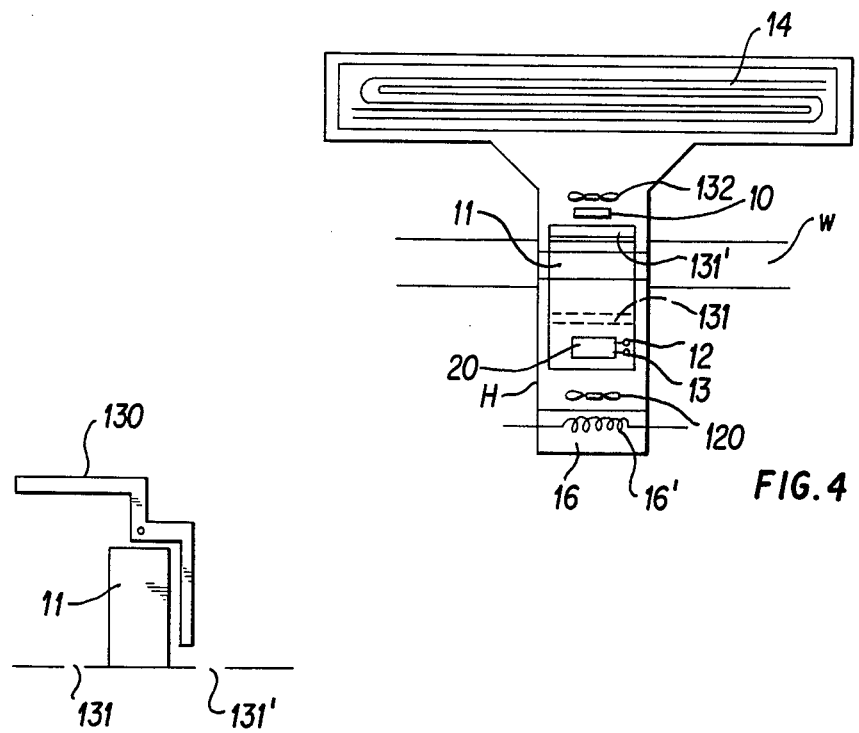
FIG. 3
FIG. 4
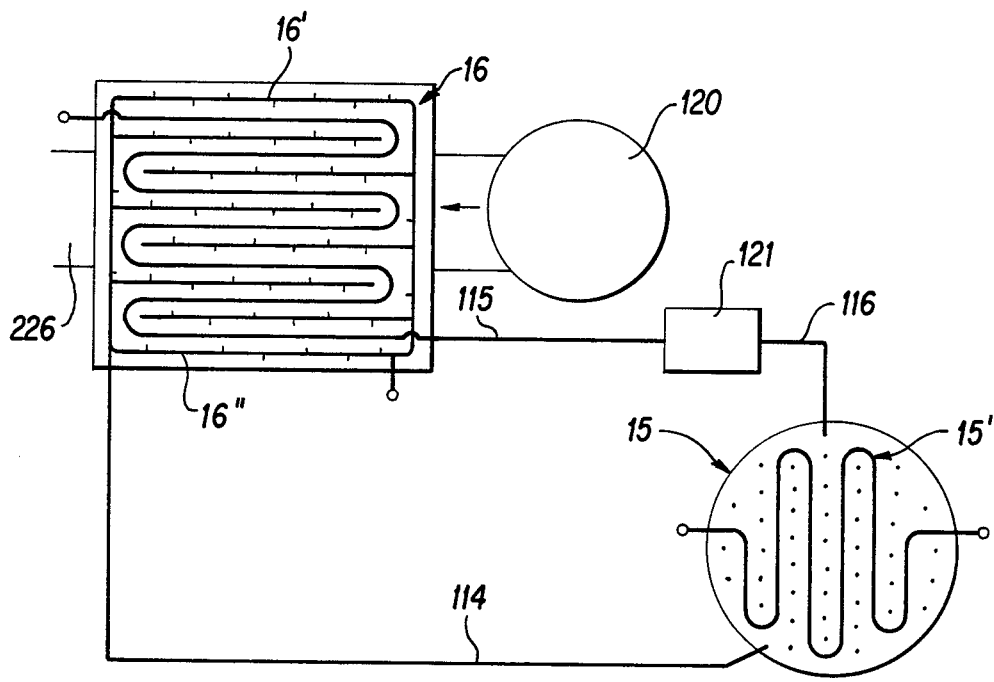
FIG. 5

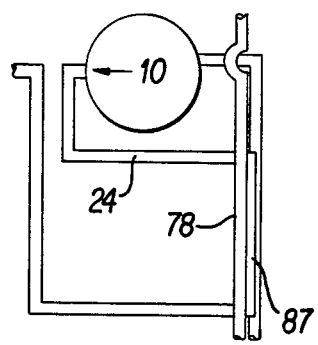 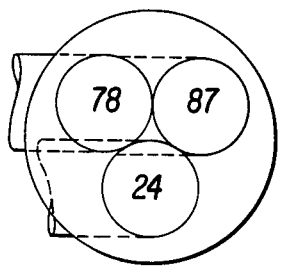
FIG. 17A          FIG. 17B
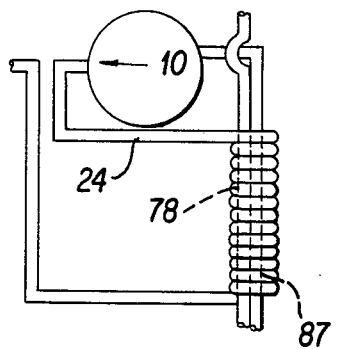 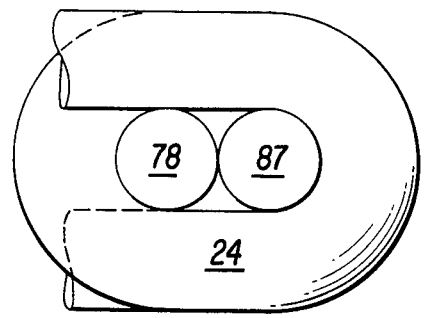
FIG. 18A          FIG. 18B

NON-REVERSIBLE MULTIPLE-REFRIGERATION-CYCLE SOLAR APPARATUS INCLUDING A VARIABLE DIRECTING VALVE MECHANISM

This application is a continuation of application Ser. No. 329,256, filed Dec. 10, 1981 now abandoned, which was a continuation of application Ser. No. 079,786, filed Sept. 28, 1979 now abandoned.

SUMMARY OF INVENTION

The apparatus consists of a modified hermaphrodite refrigeration system, and a variable directing mechanism, containing therein a defrost mechanism. It includes means for generating heating and cooling for acquiring, storing, and using the heating and cooling thus generated, and for preheating domestic hot water.

The apparatus further enables acquiring, storing and using the heat derived from solar energy, is usable with forced air or convection water systems, and includes means for defrosting the apparatus. It uses a multiplicity of true refrigeration cycles, with each cycle governing a specific function, being contained within a labyrinthine structure in which is embedded cylinders and reciprocating pistons to selectively engage a desired cycle. These functions and components, including a valve body, comprise the variable directing mechanism.

The apparatus is further adaptable to either a portable or non-portable configuration. It effects bypassing and isolating of various components of the modified refrigeration system. It enables use of storage with or without operating the main generating system. It is operable for generating, storing, and using, or for generating and storing without using, or for using alone.

A reservoir and expansion valve in the apparatus are permanently appended to the variable directing mechanism, having been permanently removed from the modified refrigeration system, though the variable directing mechanism is interconnected with the modified refrigeration system to form a complete hermaphrodite refrigeration system.

Various courses for the refrigerant are established by variably directing the refrigerant into, and guiding the refrigerant through, the various mazes of the labyrinthine structure, each course associated with a different cycle and function.

The apparatus enables variations of the generating means, the using means, and the variable directing mechanism. Storage of heat or cold in the same storage tank is enabled, as an automatic process, when in the heating or cooling cycles.

The apparatus further enables varying of the functions of heat exchangers without employment of the reversing process now in common use. It maintains the direction of flow of the refrigerant in one general direction, never reversing the direction of flow of the refrigerant, not even to defrost. It further uses renewable, reusable sources of energy, which are nonpolluting.

The apparatus is comprised of a modified hermaphrodite refrigeration system, from which the reservoir and expansion valve have been permanently removed and permanently appended to a variable directing valve mechanism, which is interconnected with the modified refrigeration system. A defrost mechanism is contained within the variable directing mechanism.

The apparatus contains a complete hermaphrodite refrigeration system capable of heating or cooling a medium, which includes a system for acquiring heat from solar energy, a system for storing and using heat derived from solar energy, and a variable directing mechanism for directing the refrigerant through the condition changing system. The refrigerant variable directing mechanism is comprised of a valve body, in which a plurality of pistons repose in cylinders, which cylinders are embedded within a labyrinthine structure, said pistons being selectively reciprocable.

The labyrinthine structure in the valve body is comprised of an assortment of separate, independent mazes, each associated with a different refrigerant course and a different cycle. The pistons each include a plurality of recesses and blocking portions, at predetermined locations, so that said open channels, recesses, and blocking portions selectively interface with various pipes and ports, the blocking portions sealing off refrigerant passage through one maze, while the recesses and channels permit refrigerant passage through various channels and ports and pipes into another maze, establishing a different refrigerant course and cycle.

Moving the piston in or out will seal off the maze and cycle currently in use, opening the maze and cycle previously blocked. The cylinders are connectable, with pipes extending from the valve housing to the elements of the condition changing system, so as to enable selective piston control of the course of the refrigerant through the various mazes in the labyrinthine structure, also varying the timing and location of the refrigerant's entrance through the elements of the condition changing system, such various mazes and timing and location being important to the establishment of different cycles. Addition of more mazes, cylinders, and pistons to the labyrinthine structure will increase the amount of true refrigeration cycles obtainable.

FIELD OF THE INVENTION

The invention relates generally to devices for heating and cooling a medium, such as water or air, so as to generate air conditioning or heating. More specifically, the invention relates to an apparatus comprised of a modified refrigeration hermaphrodite system, which is controlled by a variable directing mechanism, for conditioning such a medium by transferring heat and changing the pressure and the state of a refrigerant, to absorb, store and use heat derived from solar energy.

BACKGROUND OF THE INVENTION

Various energy sources are generally available for heating or cooling a medium such as air or water, to generate heating or air conditioning. Such energy sources include oil, gas, electricity, wood and coal.

Many of these energy sources, however, are in rapidly diminishing supply. The scarcity of such energy sources has tremendously increased the expense of using same, while greatly reducing the efficiency of such use. Further, use of such fuel sources has generated pollution of the environment. Elimination of such pitfalls, among others, is provided by the invention set forth herein.

SUMMARY OF THE INVENTION

The broad object of the present invention is to provide an apparatus for generating heating and cooling, storing and using such heating and cooling, plus acquiring, storing and using heat derived from solar energy, in an efficient, economical manner, which uses renewable and reusable energy sources, without polluting the environment.

Another object of the invention is to provide a defrost mechanism to eliminate frost, ice and snow accumulations on the apparatus, ensuring continual, efficient operation of the apparatus, especially in winter, when heat is needed most.

Another object of the invention is to provide storing of heat in the storage tank, when in the heat cycles, and the storing of cold in the same storage tank, when in the cooling cycles, as an automatic process.

A further object of the invention is to provide use of the heat of compression to preheat domestic hot water. Compression heat is generated by a compressor compressing the refrigerant, which heat, in a primary condenser, is transferred to the cold water feed to the domestic hot water tank. The primary condenser serves a two fold purpose: condensing the refrigerant from a hot high pressure gas to a cooled high pressure liquid, preparing it for entrance into an expansion valve and; transferral of the heat from the refrigerant to the cold water feed to the domestic hot water tank, thus eliminating the need of a fan to cool the refrigerant and making use of the heat, which is normally wasted.

A most specific object of the invention is to provide a multiple true cycle refrigeration system, adaptable to various conditions, including the generation of heat, the generation of cooling, the acquiring, storing and using of the heating and cooling generated, including solar energy, defrosting of the apparatus, and preheating domestic hot water, with a separate, independent true refrigeration cycle to govern and control each of these facets on an individual basis, resulting in the creation of a variable directing mechanism.

Another important object of the invention is the capability of operating the generating, storing, and using systems in unison, or operating the generating and storage systems in tandem, or operating the storage using means by itself, when the main generating system is shut down.

Another major specific object of the invention is to always keep the flow of refrigerant heading in one general direction, even to defrost, thus eliminating the reversing process and its burdensome, troublesome, costly hardware currently in use to effect heating and cooling, thereby simplifying the apparatus, and only using a single modified hermaphrodite refrigeration system, employing the use of a single expansion valve in the entire system, to effect the desired results required of each of the facets indicated above.

A primary object was to provide a variable directing mechanism with a defrost mechanism and to modify the refrigeration system, making one compatible with the other, interconnecting the elements of each, to produce the desired effect from each of the facets indicated above.

The foregoing and other advantages of the present invention have been realized by providing an apparatus, which includes means for heating and cooling a medium, such as water or air, in an efficient, economical and non-polluting manner.

The apparatus, comprised of a modified hermaphrodite refrigerating system and a variable directing mechanism, in which is encased a defrost mechanism, includes a system for gathering heat derived from solar energy. The variable directing valve is to enable such apparatus to either heat or cool a structure and perform other functions and processes relative to heating, cooling, defrosting, generating heating and cooling, storing and using such heating and cooling and, acquiring, storing and using solar heat.

The variable directing mechanism, in conjunction with the modified refrigeration system, produces a refrigeration system containing a multiplicity of true refrigeration cycles, each a separate independent cycle, each governing and controlling one specific facet of the apparatus. The valve mechanism is comprised of a plurality of pistons, reciprocably mounted in cylinders embedded in a labyrinthine structure in a valve housing, such pistons being selectively reciprocable through a predetermined range of travel. Each piston contains a plurality of recesses and blocking portions, which selectively interface with the cylinder ports at the inner ends of channels and sub-channels connected to the valve housing and cylinders. The outer ends of the channels extend beyond the valve housing and are connected to elements of the modified refrigeration system, which change the state, temperature, or pressure of the refrigerant, such changes being variously timed to variously effect heating, cooling, defrosting and acquiring solar heat. Selective activation of the pistons in the cylinders, which are embedded in the labyrinthine structure of the variable directing mechanism, controls the refrigerant passage through the proper maze in the labyrinthine structure and the course associated with the particular cycle selected, and through the elements of the modified refrigeration system, so as to enable changing of the state, temperature, or pressure of the refrigerant to generate the desired heating or air conditioning of the medium.

The apparatus further includes systems for storing or further using the heated or cooled medium, and a system for acquiring, storing and using heat derived from solar energy. In the present invention, an active solar-heat absorption system obtains heat by means of a refrigerant rapidly absorbing solar heat, directly through coil pipes, which heated refrigerant is used in the system to generate heat and is further directed through a storage tank to transfer the heat to the water within. Thus, the present invention includes an active solar-heat system, which uses the absorption method for actively gathering solar heat and using such heat, as opposed to a passive or combination solar heat system, which uses collector panels. A solar refrigerant coil is employed to actively absorb solar heat. No collector panels or water are used to acquire solar heat in a non-reversible apparatus.

DESCRIPTION OF THE DRAWINGS

FIG. 3 is a side elevational view of a heat exchanger in the present invention, used in the portable embodiment.

FIG. 4 is a schematic view of the present invention, in the portable, forced air embodiment, without storage.

FIG. 5 is a schematic view of the storing and using means in a forced air embodiment.

FIG. 17 is a fragmentary schematic view and top cross-sectional view of the straight siamese positioning of the pipes.

FIG. 18 are similar views of the coiled siamese positioning of the pipes.

DESCRIPTION OF THE PREFERRED EMBODIMENT

Figure 1:
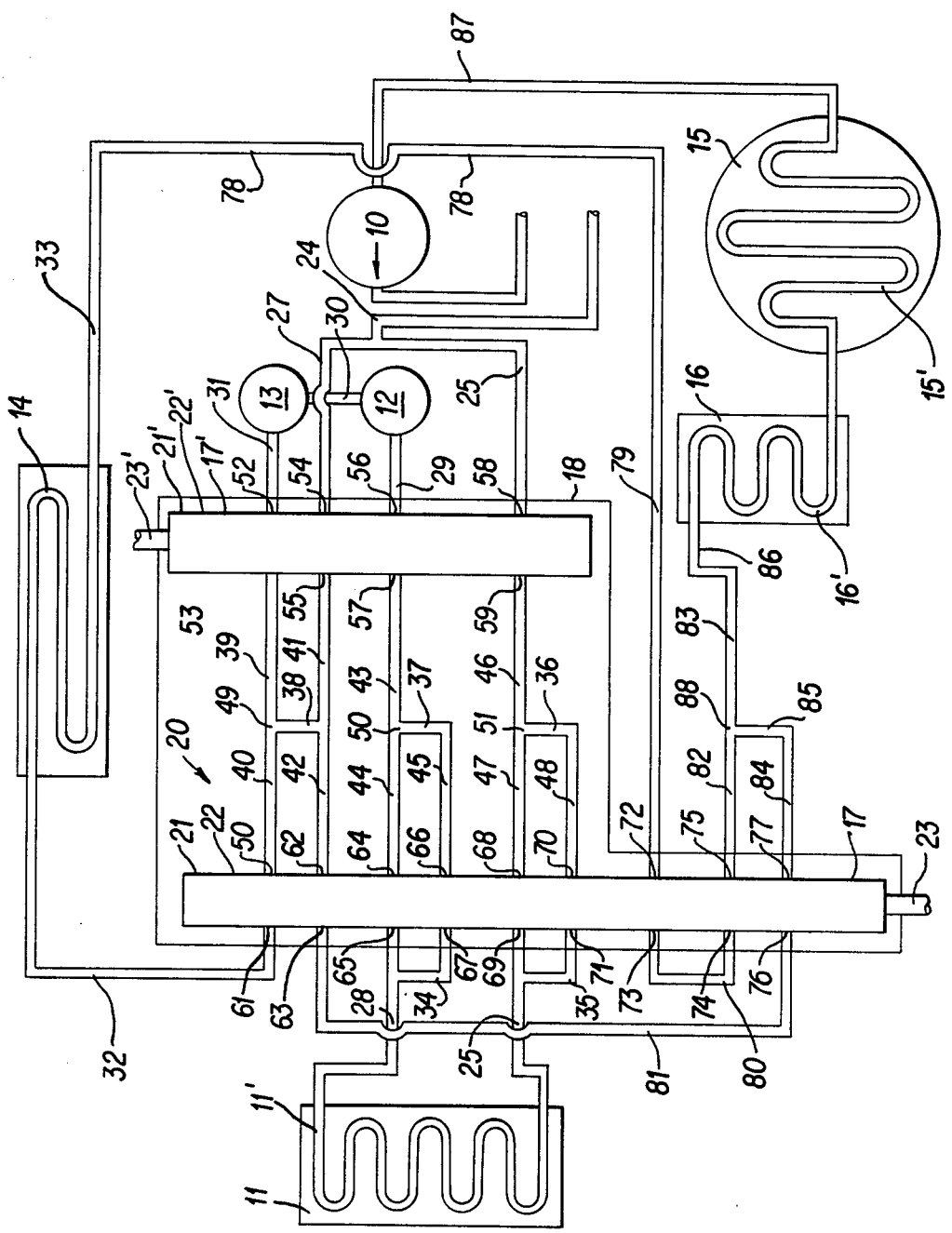
FIG. 1 is a schematic view of the present invention, in a non-portable, forced air embodiment, including solar coils.

The invention, as shown in the figures and as described herein, consists of a modified hermaphrodite refrigeration system, comprised of a compressor 10, a primary condenser heat exchanger 11, a solar coil 14, and a heat exchanger 16 necessary for delivery of heating and cooling to the interior of a structure, when utilizing a forced air system. Heat exchanger 16 can be eliminated in a water convection system.

The apparatus further includes a storage tank heat exchanger 15, and a variable direction mechanism 20, including permanently appended to 20, a reservoir 12 and an expansion valve 13. The reservoir 12 and the expansion valve 13 have been permanently removed from the refrigeration system proper and affixed to valve 20, but valve 20, reservoir 12 and expansion valve 13 are interconnected with the modified refrigeration system, thereby forming a complete hermaphrodite refrigeration system.

Solar coil 14 operates as the evaporator in the heating cycles, whereas heat exchangers 15 or 16, operate as the evaporator in the cooling cycles, depending on whether a forced air or water convection system is used. Heat exchanger 11 always operates as a common primary condenser (heating or cooling). A blower fan 120 is attached to one end of heat exchanger 16, which contains companion refrigerant coils 16' and water coils 16''. Coils 16' are independently interconnected with the modified refrigeration system valve 20, and heat exchanger coil 15', which fan blows air through and around the coils into ducts, conditioning the interior with the heating or cooling generated by the apparatus, in a forced air system.

A circulating pump 121, interconnected with the water coil 16'' in heat exchanger 16 and with storage tank heat exchanger 15, supplies heating or cooling from storage even when the main generating system is shut down, in a forced air system. A circulating pump 121, interconnected with heat exchanger 15 and storage water convectors, supplies heating or cooling from storage, even when the main generating system is shut down, in a water convection system.

Figure 12:
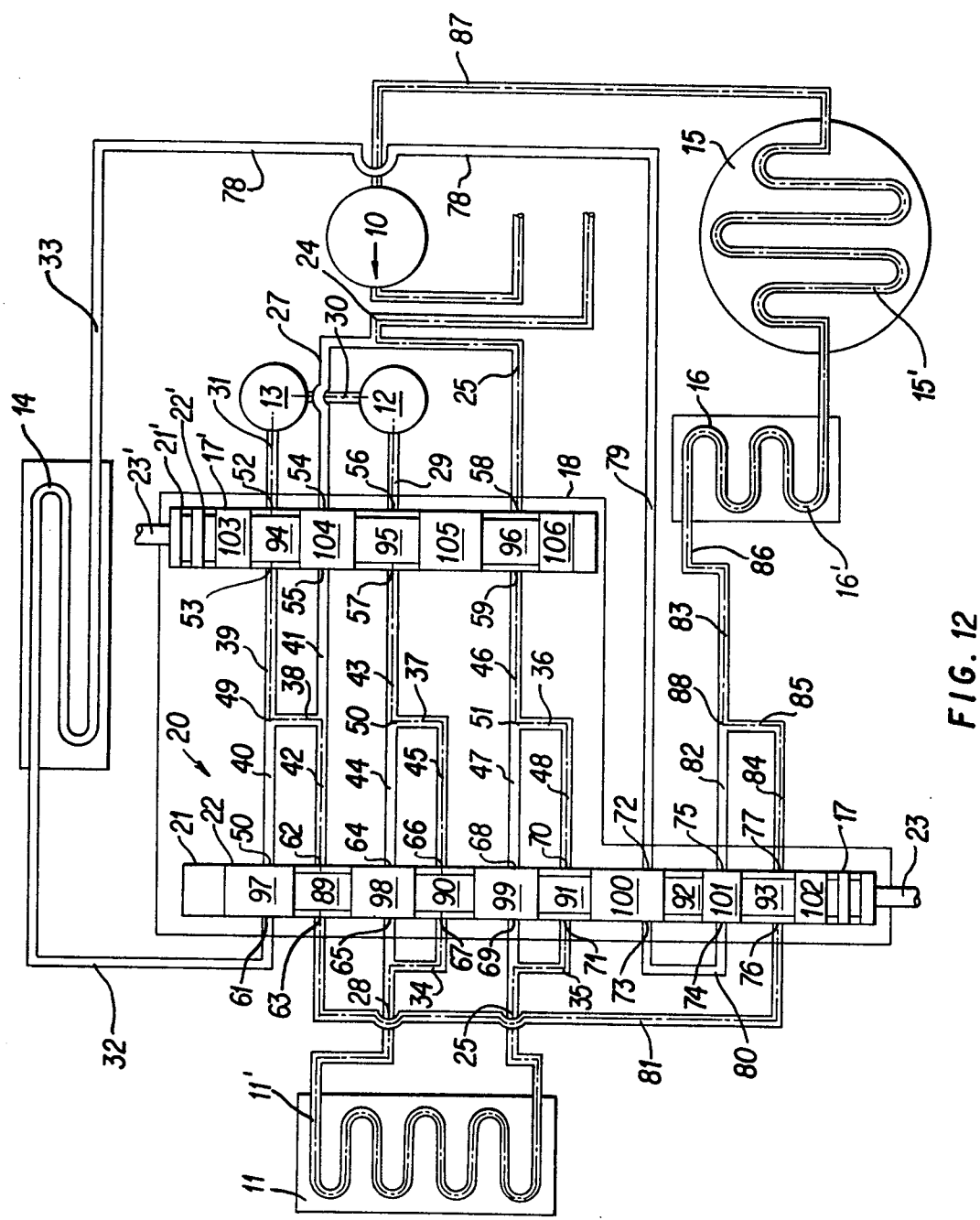
FIG. 12 is a similar view of the valve in the cooling, no-defrost, cooling and storage combination mode of operation in a forced air system.

The variable directing valve mechanism, valve 20, is comprised of a valve body containing a labyrinthine structure made up of a variety of mazes, into which are embedded two cylinders 21 and 21', which may be machined into the housing, containing two pistons. The primary cylinder 21 contains the primary piston 22, which governs and controls the heating and cooling cycles. The secondary cylinder 21' contains piston 22', governing and controlling the no-defrost and defrost cycles. If piston 22 is engaged in the heating cycles, (FIG. 8) pulling outward on piston 22 would seal off the heat cycles, at the same time, making engagement with the cooling cycles (FIG. 12). A further inward push on piston 22 would cancel out the cooling cycles, reverting back to the heating cycles.

No-defrost and defrost cycles and corresponding mazes in the labyrithine structure are governed and controlled by piston 22'. As in the heating and cooling cycles, only two positions are available to the piston 22', no-defrost and defrost, and movement of piston 22', similar to that outlined for piston 22, will engage either one or the other, no-defrost or defrost. Piston 22' is shown in the defrost position for heating or cooling in FIGS. 9 and 13, and in the no-defrost position for heating or cooling in FIGS. 8 and 12. The same movement rule applies, with pistons 22 and 22'.

As can be seen in FIGS. 8–16, pistons 22 and 22' have a multiplicity of blocking portions, and recesses, which all interface with the cylinder ports and the ends of the pipes and channels, which extend to the cylinder ports. The blocking portions seal off certain mazes associated with certain cycles, while the piston recesses are in registry with other pipes and mazes associated with different cycles, which piston recesses allow passage of the refrigerant into and out of valve 20, wherein it is directed into the proper maze associated with a desired cycle.

Each separate, independent maze provides a new course for the refrigerant, and the pistons variably direct the refrigerant through any maze desired, which corresponds with a desired cycle. A variable number of true refrigerant cycles are obtained, since the various mazes vary the timing and location of the refrigerant's engagement with the various elements of the condition changing system. For example, in the heating cycles, solar coil 14 operates as an evaporator, while all other heat exchangers operate as condensers. In all the cooling cycles, heat exchanger 16 or 15 operates as the evaporator, while solar coil 14 is bypassed and isolated from the system, by valve 20. In all heating or cooling defrost cycles, heat exchanger 11, reservoir 12 and expansion valve 13 are bypassed and isolated from the system. In the storage only cycle, heat exchanger 16 is eliminated in a water convection system. These isolations are preplanned to occur individually, in combination or in unison, depending on the cycle chosen.

Figure 8:
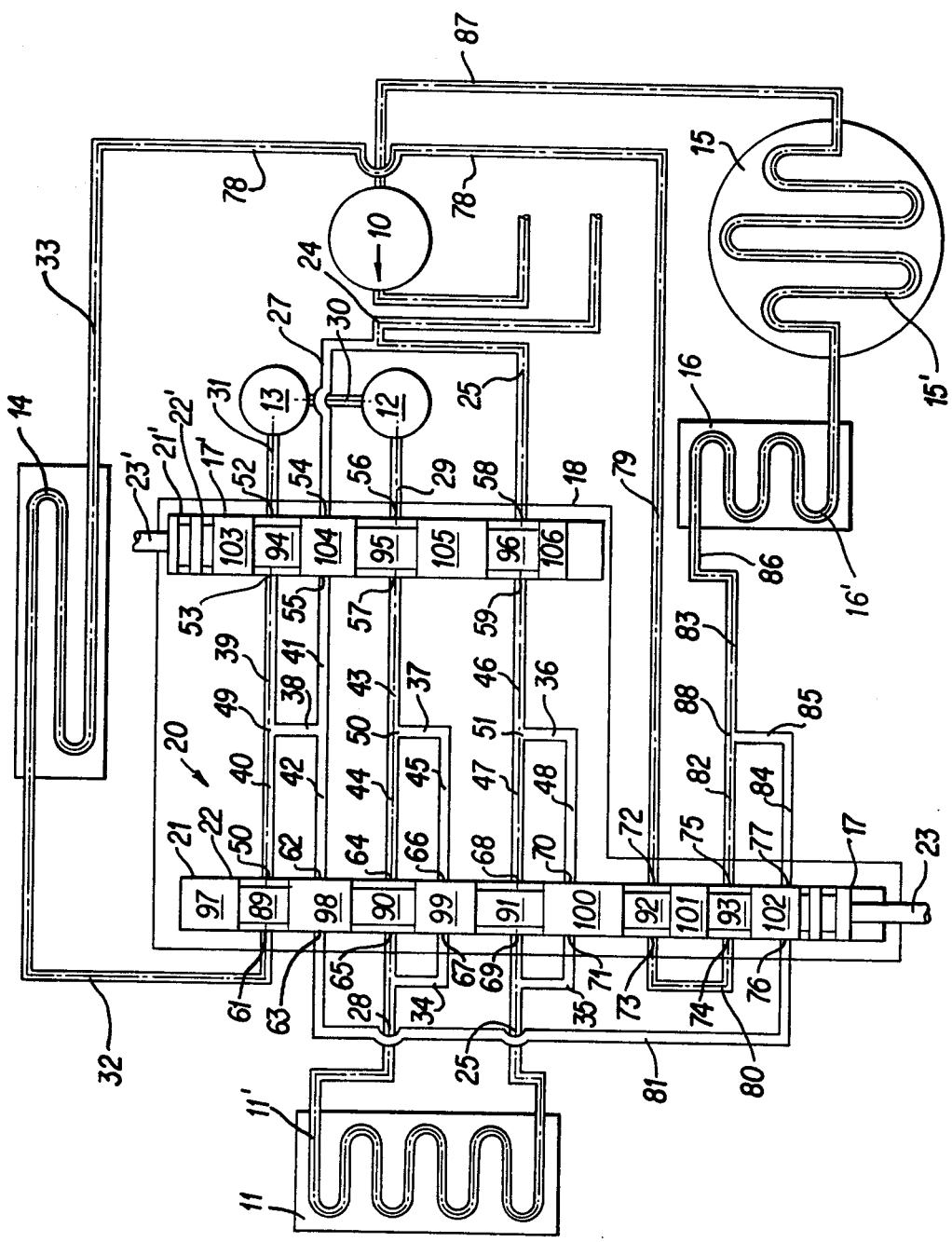
FIG. 8 is an elevational cross-sectional view of the valve in the heating, no-defrost, heat and storage combination mode of operation of a forced air system.

For example, in FIG. 8, forced air, the heat/no-defrost/heat and storage combination mode, there is no bypassing and isolating, since all elements are necessary and perform useful functions.

Figure 9:
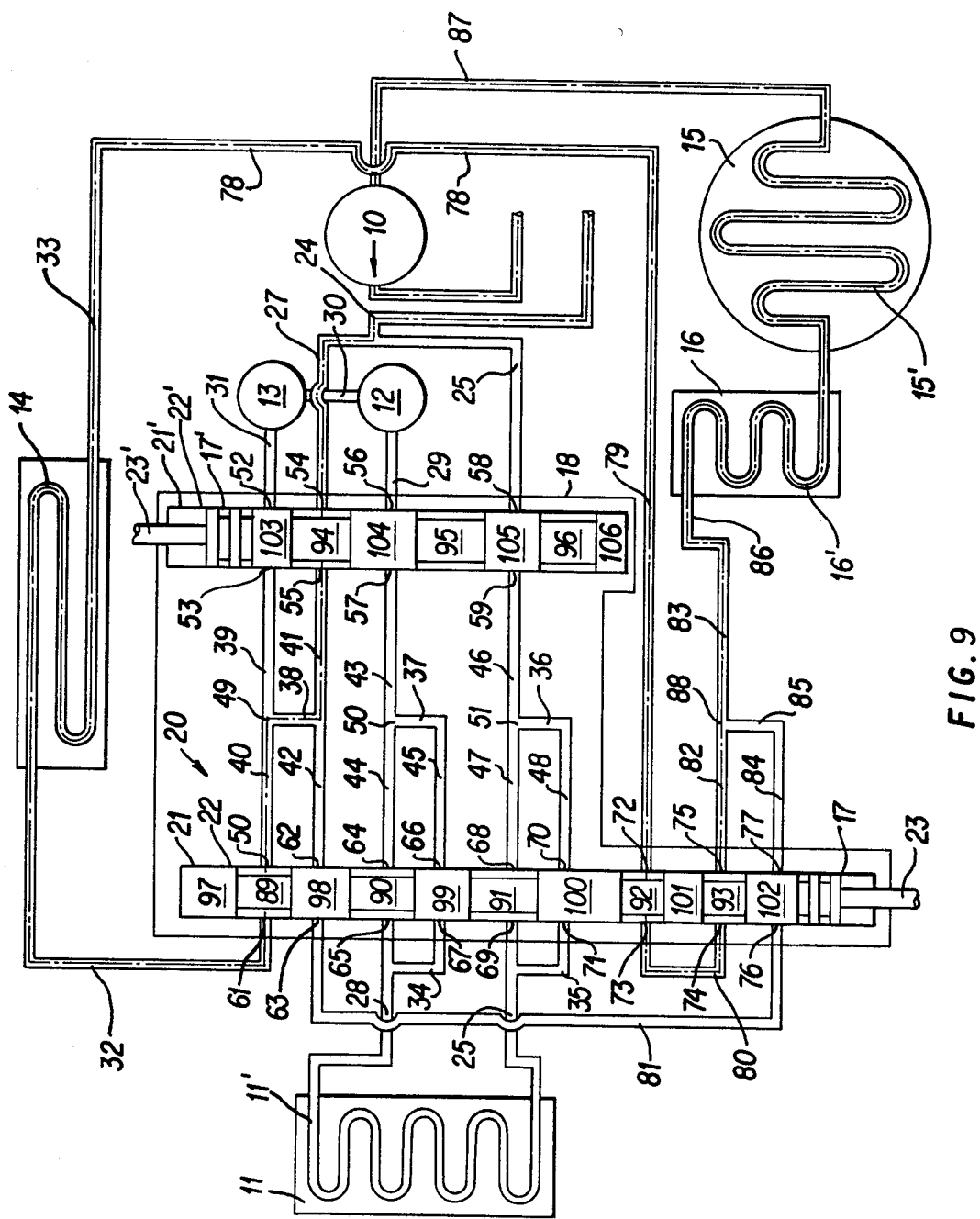
FIG. 9 is a similar view of the valve in the heating, defrost, heat and storage combination mode of operation of a forced air system.

In FIG. 9, the forced air, heat/defrost/heat-storage mode, there is bypassing and isolation of a number of elements, specifically the primary condenser heat exchanger 11, reservoir 12 and expansion valve 13. This is because piston 22 is still in the heat cycle, heat/storage mode, while piston 22' has been pushed in to the defrost position, diverting the refrigerant's course through a different maze, bypassing and isolating the above elements of the condition changing system. Thereby, the hot high pressure, compressed refrigerant gas, upon release from the compressor 10, is directed by valve 20 directly to the solar coil 14, normally operating as an evaporator, absorbing solar heat in the wintertime, where the hot refrigerant, in solar coil 14, now operating as a condenser, rids solar coil 14 of frost, ice and snow. Since restrictive elements, of the refrigerant condition changing system, such as expansion valve 13, have been bypassed and isolated, the refrigerant is free to course throughout the system unimpeded, returning to compressor 10, to be recycled. The system is defrosted in this manner. Heat exchanger 11, the primary condenser, is bypassed, so as not to remove vital heat from the refrigerant, and the total heat of compression can be brought to bear on solar coil 14. Reservoir 12 and expansion valve 13 are bypassed, since there is no need for refrigerant condition changing in defrost cycles. Pulling out piston 22' again will revert the system to the FIG. 8 cycles.

Figure 10:
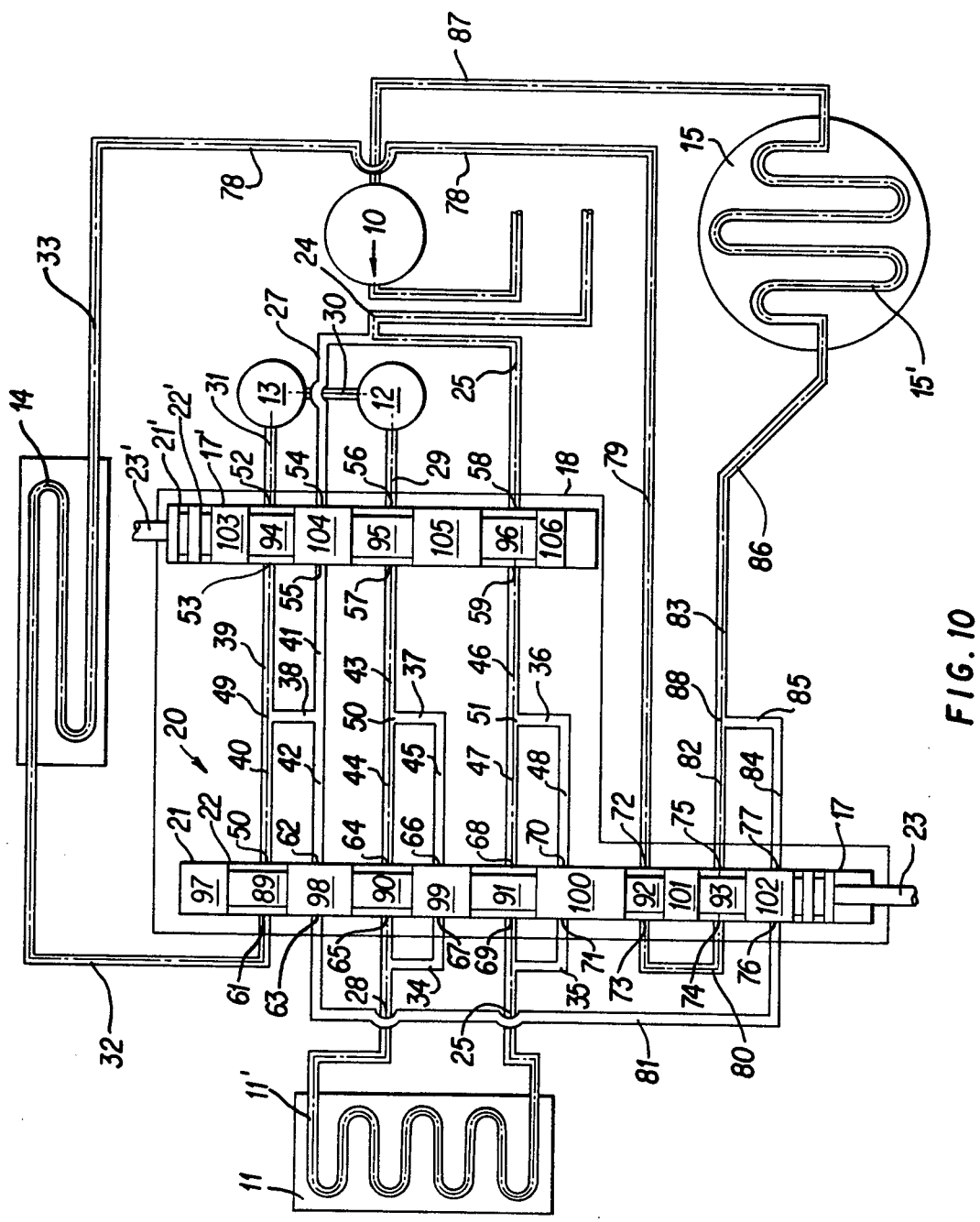
FIG. 10 is a similar view of the valve in the heating, no-defrost, storage only mode of operation of a water convection system.

In FIG. 10, the water convection, heat/no-defrost/storage only combination mode, there is no bypassing or isolating. This is because all units perform vital functions, and can put most of the heat generated into storage, with or without further heating or cooling of the interior. Applicable to the forced air system only, heat exchanger 16 is the heat/cold delivery vehicle to the interior, but serves no useful purpose, and can therefore be eliminated in a water convection system. If eliminated, heat exchanger 15 is the evaporator in the cooling cycles in a water convection system. In forced air cooling cycles, heat exchanger 16 is the primary evaporator, with heat exchanger 15 as the secondary evaporator, when in the combination forced air cycle, and heat exchanger 15 is the primary evaporator, with no heat exchanger 16 when in the storage only cycle of a water convection system.

Figure 11:
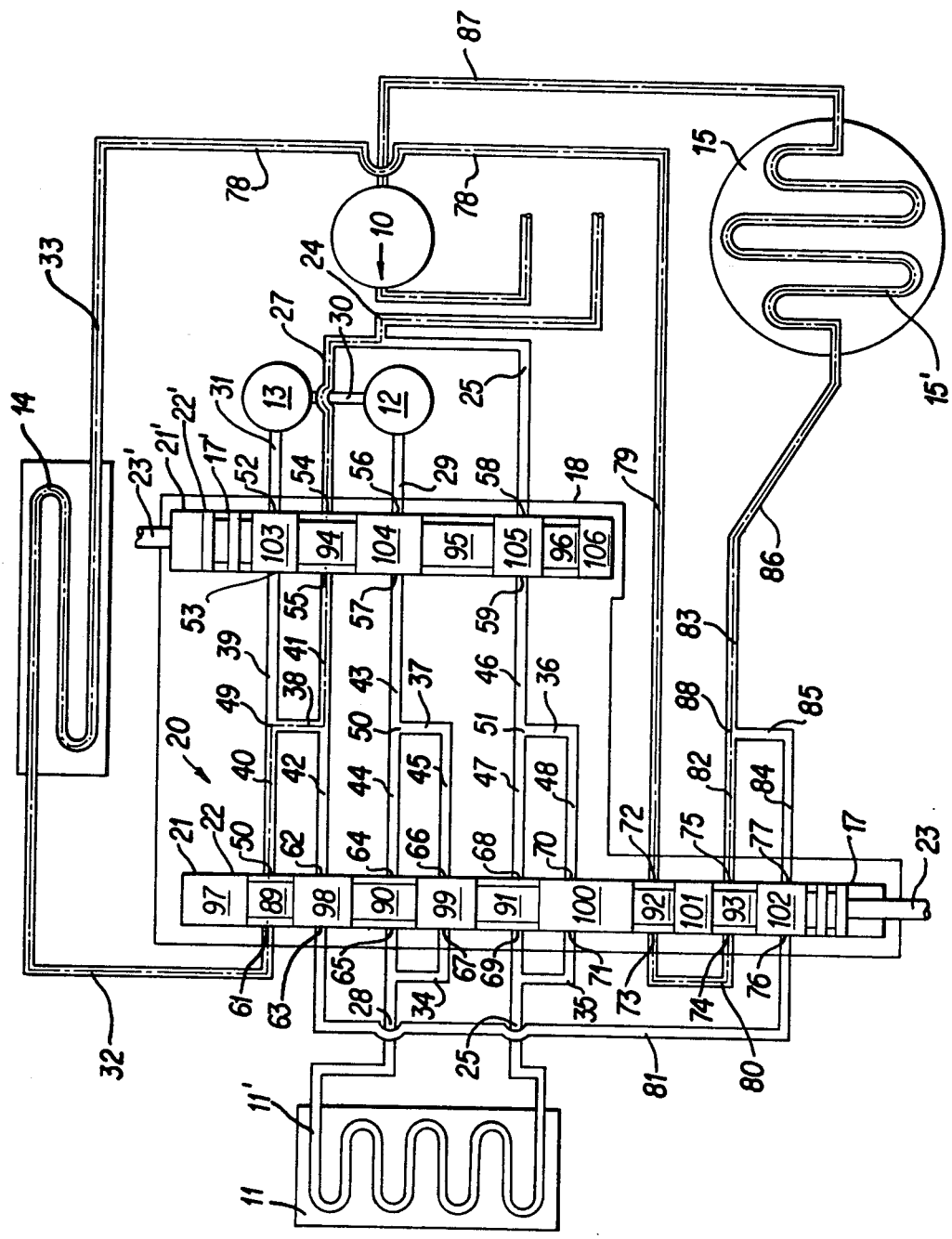
FIG. 11 is a similar view of the valve in the heating, defrost, storage only mode of operation of a water convection system.
Figure 15:
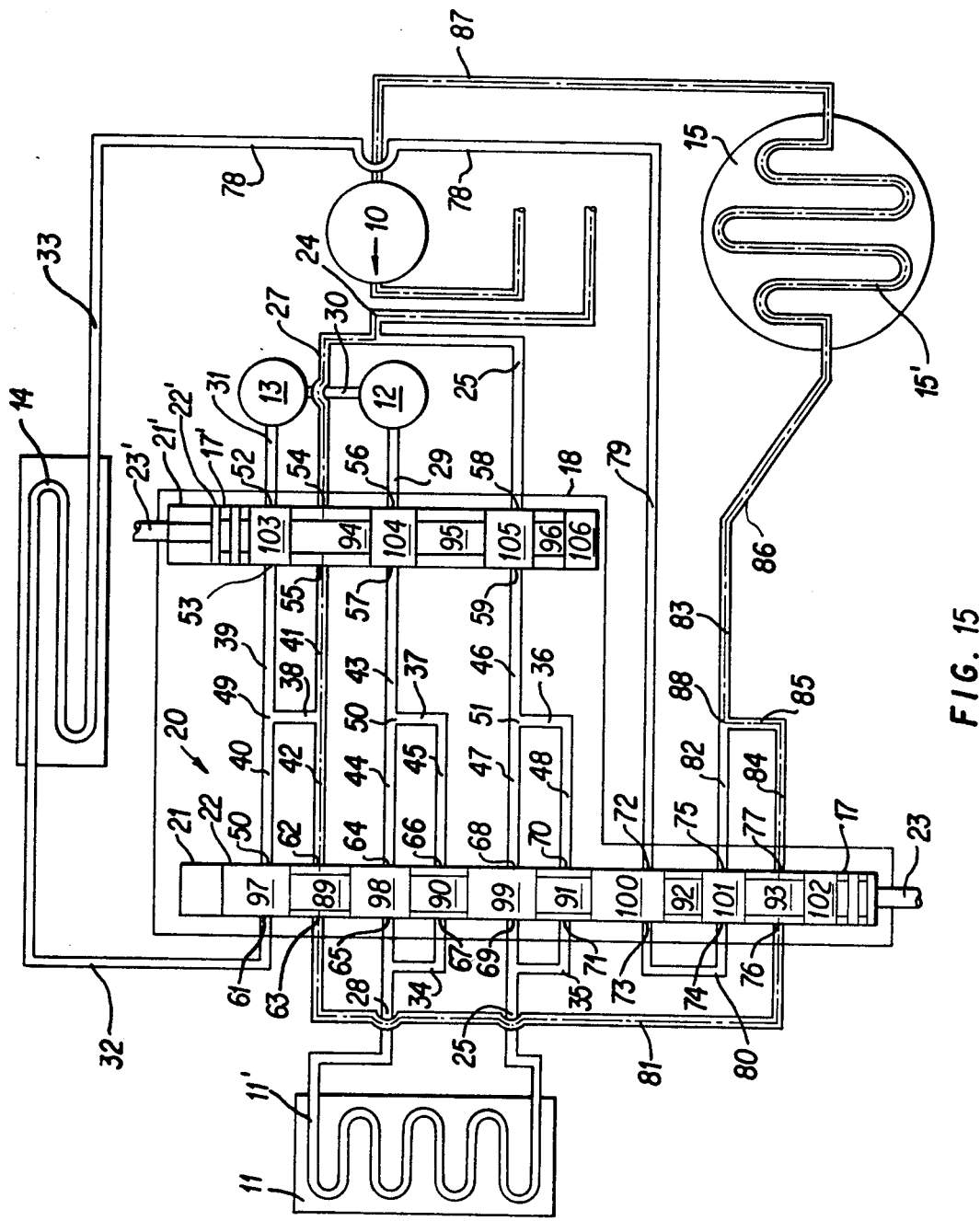
FIG. 15 is a similar view of the valve in the cooling, defrost, storage only mode of operation in a water convection system.
Figures 16A, 16B:
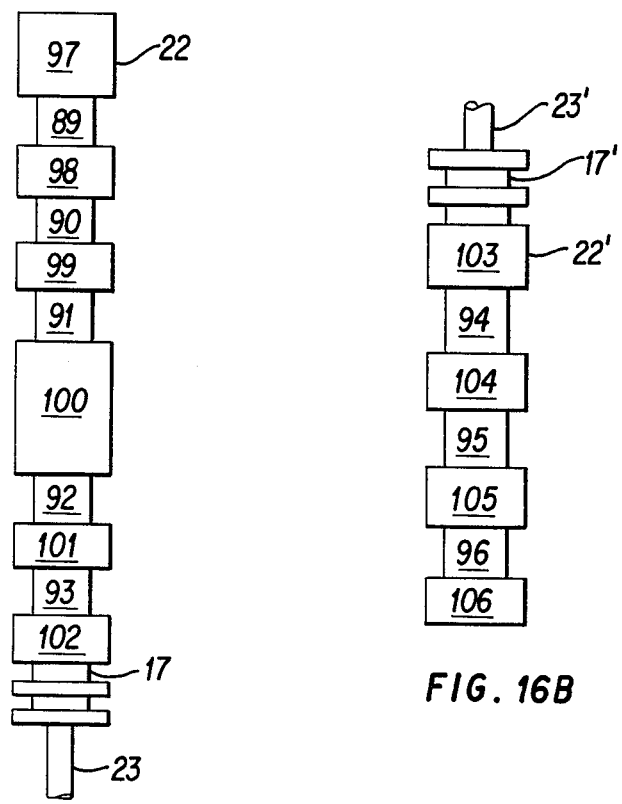
FIG. 16 is an elevational view of the two pistons employed in the apparatus.

In FIG. 11, the water convection heat/defrost/storage only combination mode, there is bypassing and isolation of heat exchanger 11, reservoir 12 and expansion valve 13, as referred to in the description of the heat cycle, FIG. 9 combination defrost cycle, and FIG. 15 (cooling) defrost storage only cycle.

In FIG. 12, the forced air cooling/no-defrost/cooling-storage combination mode, there is bypassing and isolating of solar coil 14, because this element is always bypassed in the cooling cycles, as it serves no useful function and would be detrimental. It would add heat to the refrigerant prematurely, as it would be operating as an undesirable evaporator. In all normal cooling cycles, either heat exchanger 15 or heat exchanger 16 must be the primary evaporator.

In the cooling cycles, the refrigerant must absorb as much heat as possible at heat exchangers 16 or 15, either one, operating as the primary evaporator, and premature absorption would destroy its intended function and upset the scheme of things. Piston 22 has been pulled out, changing from heat cycle to cooling cycle. Piston 22' remains as in the FIG. 8 description. In the cooling cycles, as in the heating cycles, heat exchanger 11 continues to be the primary condenser, common throughout, but bypassed and isolated, in the FIG. 9, 11, 13, 15 defrost cycles, as are the reservoir 12 and the expansion valve 13. Heat exchanger 15 stores heat in the heating cycles and cold in the cooling cycles.

Figure 13:
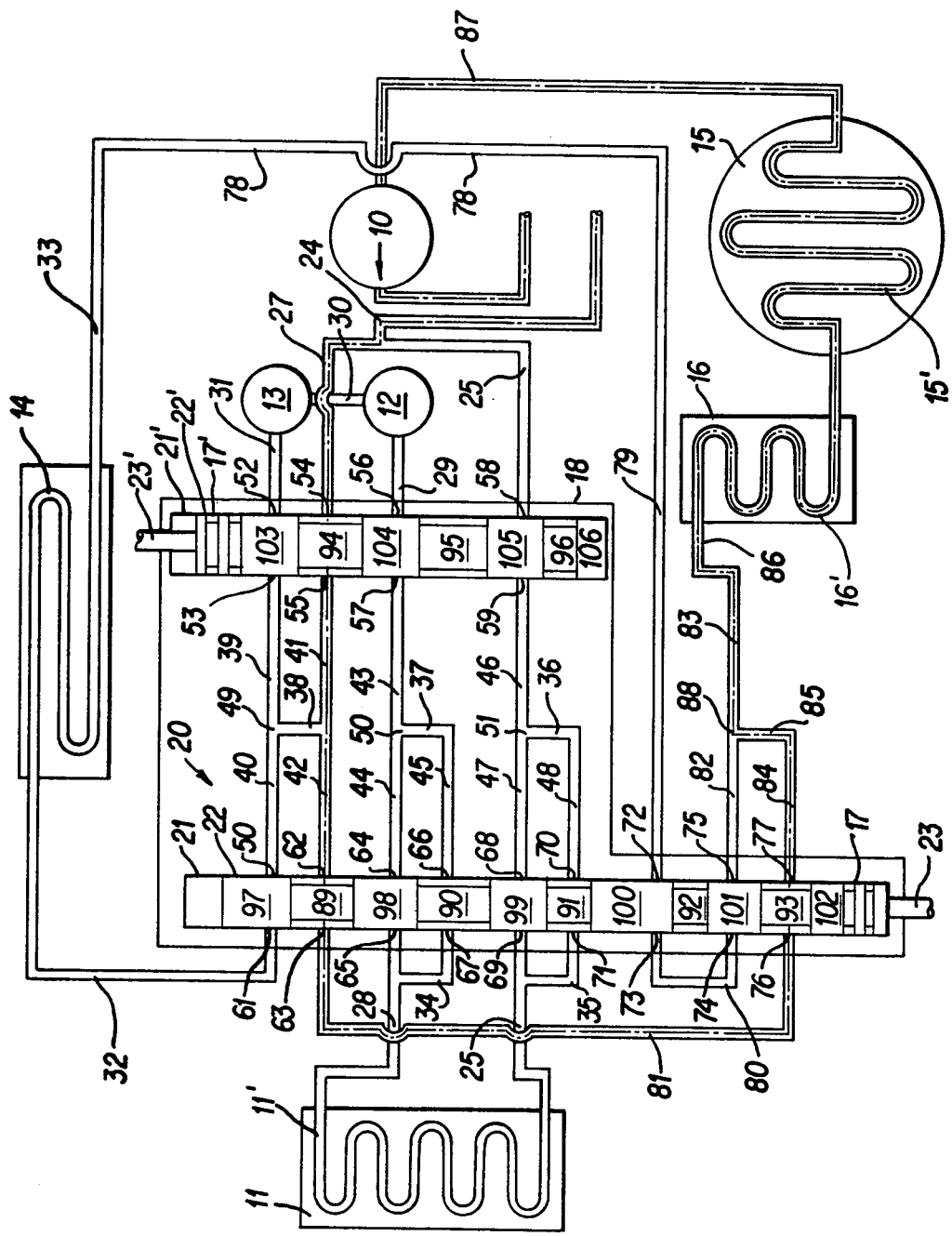
FIG. 13 is a similar view of the valve in the cooling, defrost, cooling and storage combination mode of operation in a forced air system.

In FIG. 13, the forced air cooling/defrost/cooling-storage combination mode, there is bypassing and isolation of heat exchanger 11, solar coil 14, reservoir 12 and expansion valve 13. Solar coil is 14 bypassed and isolated as explained in the description of FIG. 12. Bypassing and isolation of heat exchanger 11, reservoir 12, and expansion valve 13 is explained in the description of FIG. 9, except that in the cooling cycles, heat exchanger 15 for water convection or heat exchanger 16 for forced air is the primary evaporator, where defrosting is needed most.

To defrost, as in the heating and cooling defrost cycles, heat exchanger condenser 11, reservoir 12 and expansion valve 13 are bypassed and isolated from the system. Compressor 10 releases hot, high pressure gas refrigerant, which valve 20 sends directly to the evaporator, in this instance heat exchanger 16, defrosting same. Since restrictive elements of the refrigerant changing system have been bypassed and isolated, such as expansion valve 13, the refrigerant is free to course throughout the system unimpeded, returning to compressor 10 to be recycled. Heat exchanger 11, the primary condensor, is bypassed, so as not to remove vital heat from the refrigerant, and the total heat of compression can be brought to bear on heat exchanger 16. Reservoir 12 and expansion valve 13 are bypassed, except to reintroduce heat to the refrigerant before the refrigerant returns to compressor 10 to be recycled, since no consideration or interest is given to refrigerant condition changing in defrost cycles. Pulling out piston 22' again will revert the system to the FIG. 12 cycles.

Figure 14:
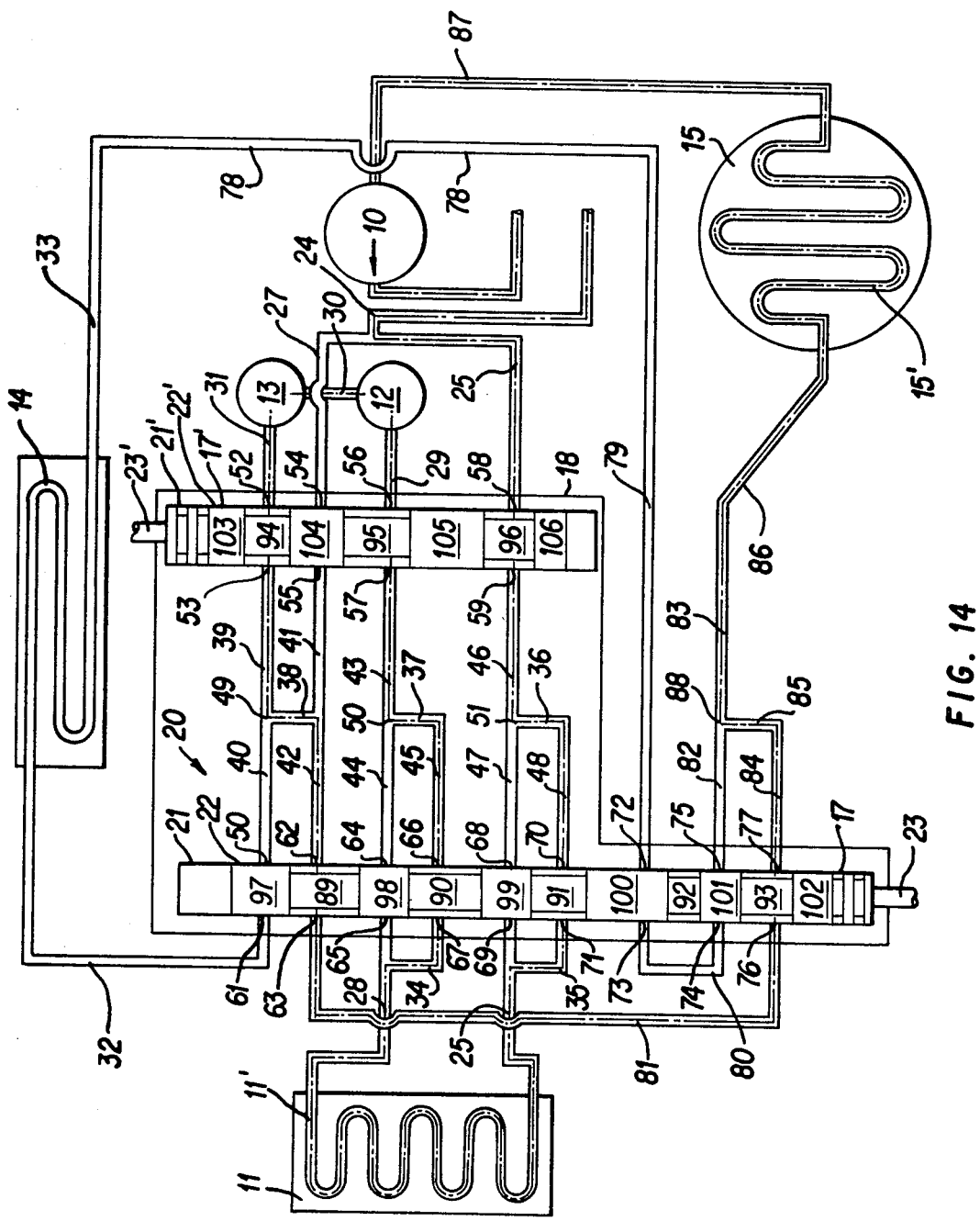
FIG. 14 is a similar view of the valve in the cooling, no-defrost, storage only mode of operation in a water convection system.

In FIG. 14, the water convection cooling/no-defrost/storage only mode, there is bypassing and isolating of solar coil 14, because of solar coil 14, as explained in the description of FIG. 12.

In FIG. 15, the water convection cooling/defrost/storage only mode, there is bypassing and isolation of solar coil 14, heat exchanger 11, reservoir 12, and expansion valve 13. Bypassing of solar coil 14 is explained in the description of FIG. 12, and of heat exchanger 11, reservoir 12, and expansion valve 13 is explained in the description of FIGS. 9 and 13.

In FIGS. 1, 2, and 5-15, an apparatus is illustrated for conditioning a medium, such as water or air, by exchanging heat and varying the pressure, temperature and state of a refrigerant. The apparatus includes a modified hermaphrodite refrigeration system and a variable directing valve, a system for heating or cooling the medium, and systems for acquiring, delivering, storing and using the heating and cooling thus generated, and systems for absorbing, storing and using solar heat.

The medium conditioning system, a modified hermaphrodite refrigeration system, comprises a system for changing the pressure, temperature and state of the refrigerant, so as to absorb and transfer heat for heating or cooling the medium, and a variable directing valve mechanism for directing the refrigerant through the condition changing system. Included in the variable directing valve mechanism, and encased therein, is a defrost mechanism.

As shown in FIGS. 1, 2, 4, and 8-15, the refrigerant condition changing system includes a compressor 10 to compress the refrigerant. A heat exchanger 11 contains cold feed water on its way to the domestic hot water tank 110, which cold water absorbs heat from the refrigerant, condensing the refrigerant from a high pressure gas to a high pressure liquid, preheating the feed water. Heat exchanger 11 contains a refrigerant coil 11', which is immersed in the feed water, or companion refrigerant and water coils may also be used. Heat exchanger 11, the primary condenser, is connected to valve 20 by pipes 26 and 28. Compressor 10 is connected to the opposite side of valve 20 by pipes 24, 25 and 27. A reservoir 12 for receiving liquid high pressure refrigerant is connected to valve 20 by pipe 29. An expansion valve 13 is connected to reservoir 12 by pipe 30 and to valve 20 by pipe 31.

The solar energy absorption system comprises refrigerant coil, 14 positioned so as to receive solar energy, and connected on the inlet side to valve 20 by pipe 32 and on the outlet side by pipes 33, 78 and 79 to valve 20. A further heat exchanger 16 includes companion refrigerant coil 16' and water coil 16", which coil 16' is connected to valve 20 by manifold pipe 88, channels 82, 83, 84, 85 and pipe 86, and which water coil 16" is connected to storage water in heat exchanger 15 by pipes 114, 115, 116 and pump 121 (FIG. 4). Refrigerant coil 16', in heat exchanger 16, is also directly connected to refrigerant coil 15', in heat exchanger 15. Refrigeration coil 15' in heat exchanger 15 is connected to compressor 10 by pipes 87 shown in FIGS. 1, 2, 8–15, 17 and 18 as being in siamese position with pipes 24, 78 for the purpose of enabling the cooled refrigerant in pipe 87 to absorb heat from the refrigerant in pipe 78 in the heating cycles. The siamese position of pipes 24, 78 and 87 enables continuous heat reintroduction to the cooled refrigerant in pipe 87, before it returns to compressor 10 to be recycled.

Valve 20, as illustrated in FIGS. 8–15, includes two cylinders 21, 21', in which pistons 22, 22' are encased, so as to be reciprocably movable within prescribed limits. Means for moving pistons 22, 22' are provided, comprising shafts 23 and 23' connected to pistons 22, 22'. Each shaft 23 and 23' is operated by electric solenoids in a valve sealing end plate, to enable movement of each piston through a prescribed range limit, which movement of pistons is not a continuous action. The solenoids may be of the screw in type, for ease of replacement.

A plurality of manifold ports 52–77 manifold pipes 49 to 51, 80, 81 and 88, pipes 24–33 78, 79, 86, and 87, and channels 34–48, 82–85, interconnect compressor 10 refrigerant coil 11' in heat exchanger 11, valve 20 solar coil 14, refrigerant coil 16' in heat exchanger 16 and refrigerant coil 15' in heat exchanger 15, and reservoir 12 and expansion vavle 13.

Pistons 22 and 22' in vavle 20, include recessed portions 89–96, and pistons 22, 22' include a multiplicity of blocking portions 97–105. Portion 106, while not a blocking portin, establishes the area of recessed portion 96 and serves to contain the refrigerant within that area. Storage water pipes 114, 115, 116 are provided in a forced air system, and pipes 114, 115, 116, 117, 118 and convectors are provided in a water convection system. Water pump 121 is provided in both systems for use of storage water in heat exchanger 15. A blower fan 120 replaces convectors in a forced air system.

Heat exchanger 11, in the portable unit only, FIGS. 3 and 4, includes pivotably mounted sealing flap 130. The portable apparatus further includes inside and outside louvers 131, 131', not provided and unnecessary with heat exchanger 11 in the non-portable apparatus in FIGS. 1 and 2, and further includes blower fans 120 and 132. All other features are similar to those of the non-portable apparatus 19, except for the size and shape of component parts.

GENERATING, STORING AND USING MEANS

Domestic hot water storing is provided by tank 110, in which the heat generated through heat exchanger 11 and compressor 10 may be stored. Tank 110 is connected to a source of water, and an outlet for such water, such as faucets, and the generating means by pipes 111, 112, and 113. Coil 11, in heat exchanger 11, when coil 11' contains heated refrigerant, transfers such heat to the water contained within heat exchanger 11 by coil immersion shown in FIG. 7, and such pre-heated water is stored in tank 110, for use at the faucets, after being fully heated by the conventional methods.

For home heating or cooling, storing is provided by tank heat exchanger 15, containing refrigerant coil 15', immersed in the storage water, in which the heating or cooling generated may be stored, and means for interconnecting the component parts are provided. In the heating cycles, heat exchanger 15 operates as a condenser, some of the solar heat contained in the refrigerant in coil 15' being transferred to the already hot storage water. In the cooling, storage only cycles, heat exchanger 15 operates as an evaporator, the heat contained in the storage water being absorbed by the refrigerant in coil 15' in heat exchanger 15. In the combination cooling cycle, heat exchanger 16 is the primary evaporator and heat exchanger 25 operates as a secondary evaporator, with the heat being absorbed by the refrigerant. In all the defrost cycles, heating or cooling, the entire system is operating as one large condenser, with no evaporator evident.

Ducts 226 and a blower fan 120 are mounted on opposite ends of heat exchanger 16. The blower sends air around and through the companion coils 16' and 16" in heat exchanger 16, into ducts 226, heating or cooling the interior, in a forced air system. A storage tank heat exchanger 15 is further provided and interconnected with coil 16", the water coil in heat exchanger 16, and pump 121, by pipes 114, 115 and 116. For use of storage heating or cooling, even when the main generating system is shut down, pump 121 pumps the heated or cooled storage water from heat exchanger 15 through pipes 116, 115 into water coil 16" in heat exchanger 16 where fan 120 blows air through and around the coils 16' and 16", heating or cooling the interior, by means of ducts 226. Water returns to heat exchanger 15, through pipe 114, to be recirculated.

In a water convection system, heat exchanger 16 is eliminated from the system, as it serves no useful purpose, and water pump 121 pumps the heated or cooled storage water from heat exchanger 15 through pipes 114 to 117, into and through convectors 216, heating or cooling the interior, the water returning through pipe 118 to heat exchanger 15, to be recirculated, even when the main generating system is shut down. When in the heating cycles, heat exchanger 15 stores heat and when in the cooling cycles heat exchanger 15 stores cold. This applies to forced air and water convection systems.

In the heating cycles, hot water is stored in tank heat exchanger 15 for use in heating the interior, and is generated, stored and used as follows:

As shown in FIG. 8, in the forced air heat/no-defrost/heat and storage combination mode, solar coil 14, operating as an evaporator, rapidly absorbs solar heat through the coil piping into the refrigerant, which is carried via pipes 33 and 78, pipe 79 into valve 20, which directs the heat bearing refrigerant into and through manifold pipes 80 and 88, channels 82 and 83, and pipe 86 leading into coil 16′ in heat exchanger 16, where coil 16′, in conjunction with hot storage water coil 16″, concentrates the heat of both systems, so fan 120 blows air through and around both sets of coils, heating the air. The heated air is blown through ducts, heating the interior of the structure. The refrigerant exits coil 16′ in heat exchanger 16 going directly into refrigerant coil 15′ in heat exchanger 15, where the heat remaining in the refrigerant is transferred to the storage water in heat exchanger 15. The refrigerant exits coil 15′, travels through pipe 87 (siamese) back to compressor 10 to be recycled.

In the FIG. 10 water convection, heat/no-defrost, storage only mode, the difference between this cycle and the one above, is that now heat exchanger 16 has been eliminated in a water convection system. Valve 20 now directs the heat bearing refrigerant directly through manifold pipes 80 and 88, channels 82 and 83, and pipe 86 into refrigerant coil 15′ in heat exchanger 15, where the heat is transferred to the storage water, with much of the heat being deposited in storage, with or without further heating of the interior taking place. This mode is especially useful when the interior is warm enough but storage is depleted.

In the forced air cooling cycles, cold water is stored in tank heat exchanger 15, for use in cooling the interior, and is generated, stored and used as follows:

In FIG. 12 forced air cooling/no-defrost/cooling storage combination mode: low pressure liquid refrigerant is directed by valve 20 through manifold pipes 49, 81, 88, channels 39, 38, 42, 84, 85, 83, and pipe 86 into refrigerant coil 16′ in heat exchanger 16, operating as an evaporator, wherein coil 16′ rapidly absorbs heat into the refrigerant from storage water coil 16″ and the surrounding air. Blower fan 120 blows the cooled air through and around the coils into ducts 226, cooling the interior of the structure. The refrigerant exits coil 16′ in heat exchanger 16 directly entering coil 15′ in heat exchanger 15, where it will still absorb more heat from the storage water in heat exchanger 15. The heat thus absorbed by the refrigerant will be used in the repeat cycle, where, in heat exhanger 11, such heat will be transferred to the cold water feed to the domestic hot water tank, preheating the water on its way to tank 110 and eventually the faucets. The refrigerant exits coil 15′ in heat exchanger 15, via pipe 87, back to compressor 10, to be recycled. Solar coil 14 is bypassed and isolated in the cooling cycles, as it serves no useful function and would only serve to prematurely add heat to the refrigerant, whose prime function is to absorbe as much heat as possible at the primary evaporator, in this case heat exchanger 16, and not before.

In the FIG. 14 water convection cooling/no-defrost, storage only cycle, the difference between this cycle and the one directly above is that heat exchanger 16 has been eliminated in a water convection system. Valve 20 now directs the low pressure liquid refrigerant through manifold pipe 88, and pipe 86 into refrigerant coil 15′ in heat exchanger 15, now operating as the primary evaporator, wherein the refrigerant rapidly absorbs the heat in the storage water, leaving the water cold. The cold water, when cooling is needed, is pumped by pump 121 from heat exchanger 15 through convectors 216 and back to heat exchanger 15, cooling the interior of the structure, even when the main generating system is shut down. The refrigeration exits coil 15′ in heat exchanger 15 via pipe 87, back to compressor 10, to repeat the cycle, especially useful when the interior is cool enough and cold storage is depleted.

A particular feature is that hot and cold storage may be generated without further operating the using apparatus, and, when storage is sufficient, one may use the storage without further generating it, in all cases, or storage may be used while generating.

In the water convection heating cycles, hot water is stored in tank heat exchanger 15 for use in heating the interior, and is generated, stored and used as follows: It is to be presumed that the convection system is a new installation, minus heat exchanger 16, which serves no useful purpose in this type of system. As such, when referring to the FIGS. 10, 11, 14 and 15, note that heat exchanger 16 is removed from the system, so the refrigerant can travel through manifold pipe 88, and pipe 86 directly into coil 15′ in heat exchanger 15.

In the FIGS. 10, 11, 14 and 15 water convection systems, the difference between forced air and water convection systems is the method of using the heat generated. The heated storage water in heat exchanger 15 is pumped by pump 121 from heat exchanger 15 through pipes 114, 115, 116, 117 into and through convectors 216, heating the interior of the structure, with or without the main generating system in operation. The storage water returns from convectors 216 to heat exchanger 15, returning through pipe 118, continouously repeating the cycle. Using the storage without the main generating sytem in operation is dependent on sufficient storage heat being available.

In the FIG. 14 water convection cooling/no-defrost storage only cycle, valve 20 directs the low pressure liquid refrigerant through manifold pipe 88 and pip 86, directly into coil 15′ in heat exchanger 15, operating as an evaporator, where the refrigerant rapidly absorbs the heat from the storage water, leaving the water cold. Pump 121 pumps the cold storage water from the heat exchanger 15 through pipes 114, 115, 116, 117 into and through convectors 216 returning to heat exchanger 15 via pipe 118, cooling the interior of the structure. The hot refrigerant exits coil 15′ in heat exchanger 15, via pipe 87, back to compressor 10 to be recycled. The heat thus absorbed by the refrigerant will be used in the repeat cycle, where, in heat exchanger 11, such heat will be transferred to the cold water feed to the domestic hot water tank, preheating the water on its way to tank 110, and eventually the faucets. Solar coil 14 is isolated and bypassed in all cooling cycles for the same reasons explained above. The evaporator in this case is heat exchanger 15 in the cooling cycles. The storage water returns from the convectors 216, via pipe 118, continuously repeating the cycle, to heat exchanger 15. A glycol solution should be used in heat exchanger 15 at all times to prevent freeze up when in cooling cycles.

In operation, upon engaging by pushing in piston 22 in valve 20 in the heat cycle, and by movement in or out of piston 22′, a total of four heat cycles of a different nature are available, two for convection heating and two for forced air heating. If piston 22, currently in a heat cycle, were to be pulled out, the heat cycle would be blocked out, and the cooling cycle would automatically come into operation, and vice versa. Again, movement in or out of piston 22′ would provided four cooling cycles all different, two for forced air and two for convection systems. In effect, a total of eight different, separate, independent, true refrigerant cycles have been obtained, four for forced air and four for convection systems, each with a different result, with a potential for obtaining an unlimited number of true refrigeration cycles, by incorporating more mazes and pistons in the labyrinthine structure of valve 20, if one could find use for additional cycles. By variously moving in or out pistons 22, 22', various heating or cooling cycles, each with a different result, can be obtained, as indicated below.

OPERATION AND FUNCTION OF EACH OF THE FOUR HEATING AND FOUR COOLING CYCLES

FIGS. 1, 4, and 8 illustrate the heat/no-defrost/heat-storage combination cycle.

In FIGS. 1, 4, and 8, a forced air system, compressor 10 compresses a low pressure gas refrigerant into a hot high pressure gas refrigerant, which is then released through: pipes 24 and 25, port 58, piston recess 96 in piston 22' (in no-defrost position), channels 46-47 and ports 59 and 68 in manifold pipe 51, recess 91 in piston 22 (in heat position), port 69, pipe 26, refrigerant coil 11' in primary condensor heat exchanger 11, where the refrigerant is cooled and changes state to a high pressure liquid. The refrigerant exits coil 11' in heat exchanger 11 via pipe 28, entering valve 20 and passing through: port 65, piston recess 90 in piston 22, port 64, channels 44, 43, of manifold pipe 50, port 57, piston recess 85 in piston 22', port 56, pipe 29, reservoir 12, pipe 30, into and through expansion valve 13, where the refrigerant is changed to a low pressure liquid, and proceeds through pipe 31 back into valve 20. In valve 20, the low pressure liquid refrigerant passes through: port 52, piston recess 94 in piston 22', port 53, channels 39 and 40, manifold pipe 49, port 60, piston recess 89 in piston 22, port 61, pipe 32, into solar coil 14, which is operating as an evaporator, where the low pressure liquid refrigerant rapidly absorbs solar and/or ambient heat and changes state to a low pressure gas. The heat laden refrigerant leaves solar coil 14, through pipe 33. The hot refrigerator continues through pipes 78 and 79 into valve 20, where it passes through: port 72, recess 92 in piston 22, port 73 in manifold 80, port 74, piston recess 93 in piston 22, port 75, channels 82, 83 in manifold pipe 88 and pipe 86, into refrigerant coil 16' in heat exchanger 16, operating as a condenser. The refrigerant leaves coil 16' in heat exchanger 16 directly entering refrigerant coil 15' in heat exchanger 15 storage tank, where some of the remaining heat in the refrigerant is transferred to the storage water. The refrigerant then leaves coil 15' in heat exchanger 15 via pipe 87, back to compressor 10, to repeat the cycle. The function of this cycle is to generate, store and use heat, for heating and hot water use within the premises.

FIGS. 1, 4 and 9 illustrate the forced air heat/defrost/heat-storage combination cycle, in a forced air system. Compressor 10 compresses a low pressure gas refrigerant into a high pressure gas which is then released through: pipe 24 in siamese position with pipes 78 and 87, then into pipe 27, port 54, piston recess 94 in piston 22' in defrost position, port 55, channels 41, 38, 40 in manifold pipe 49, port 60, piston recess 89 in piston 22 in heat position, port 61, pipe 32, into solar coil 14, operating as a condenser. The hot high pressure gas refrigerant travels directly from the compressor 10 to solar coil 14, bypassing and isolating primary condenser heat exchanger 11, reservoir 12 and expansion valve 13, thereby suffering no heat loss, bringing the heat from heat exchanger 15, with the heat of compression from compressor 10, to totally bear on defrosting ice and snow on solar coil 14. Bypassing and isolating the primary condenser heat exchanger 11 and expansion valve 13, allows the refrigerant to be directed throughout the system unimpeded, back to compressor 10, to repeat the cycle.

In the normal heat cycles, solar coil 14 operates as an evaporator, but in the heat defrost cycles, solar coil 14 operates as a condenser. The evaporator absorbs solar and/or ambient heat, whereas a condensor gives off heat. Being able to change solar coil 14 from an evaporator to a condenser and vice versa is a function further incorporated in valve 20, and also applies to heat exchanger 16, when used, or to heat exchanger 15, as will be seen, when switching from heating to cooling cycles and vice versa. Moving piston 22' to the defrost position, as in this cycle, eliminates any evaporator from the system, turning the entire system into one large condenser, with the hot high pressure gas refrigerant being sent directly from compressor 10 to solar coil 14, defrosting ice and snow on solar coil 14. Pulling out piston 22' will revert the system to the FIG. 8 cycle.

In the winter, ice and snow, which renders solar units ineffective, when heat is needed most, can be rapidly and easily eliminated by the defrost mechanism incorporated in valve 20. In the heat defrost cycles, units 14, 16, 15 all operate as condensers, dissipating heat, defrosting the apparatus. The refrigerant leaves coil 14 through pipe 33. The refrigerant continues through pipe 78 in siamese position with pipes 24, 87, then into pipe 79, valve 20, port 72, piston recess 92 in piston 22, port 73 in manifold pipe 80, port 74, piston recess 93 in piston 22, port 75, exiting valve 20, into channels 82 and 83 in manifold pipe 88. The refrigerant moves through: manifold pipe 88, pipe 86, coil 16' in heat exchanger 16, coil 15' in heat exchanger 15, where some of the remaining heat in the refrigerant is transferred to the storage water. The refrigerant leaves coil 15' in heat exchanger 15, through pipe 87, back to compressor 10, to repeat the cycle. In any defrost cycle, heating or cooling, the blower fans for forced air remain inactive, so the heat in the refrigerant can be used exclusively to attack and eliminate frost, ice and snow buildups on the system.

In each individual cycle, forced air or water convection systems use a somewhat similar basic refrigerant cycle. In convection systems, storage may continue to be used during the defrost cycle, as outlined above, by pumping storage water from heat exchanger 15, by pump 121, sending the water through the convectors, heating the interior, the water returning to heat exchanger 15, to repeat the cycle, since it would have no detrimental effect on the heat bearing refrigerant, whereas in the forced air system, the blower 120 would remove too much heat from the refrigerant and would have a detrimental effect on the defrost cycle. The function of this cycle is to generate heat and pressure, using same to defrost the system and store some of the heat remaining in the refrigerant upon completion of the cycle. If the storage water is already hotter than the refrigerant, it would add heat to the refrigerant, making it more efficient so as to more quickly defrost the system.

Figure 2:
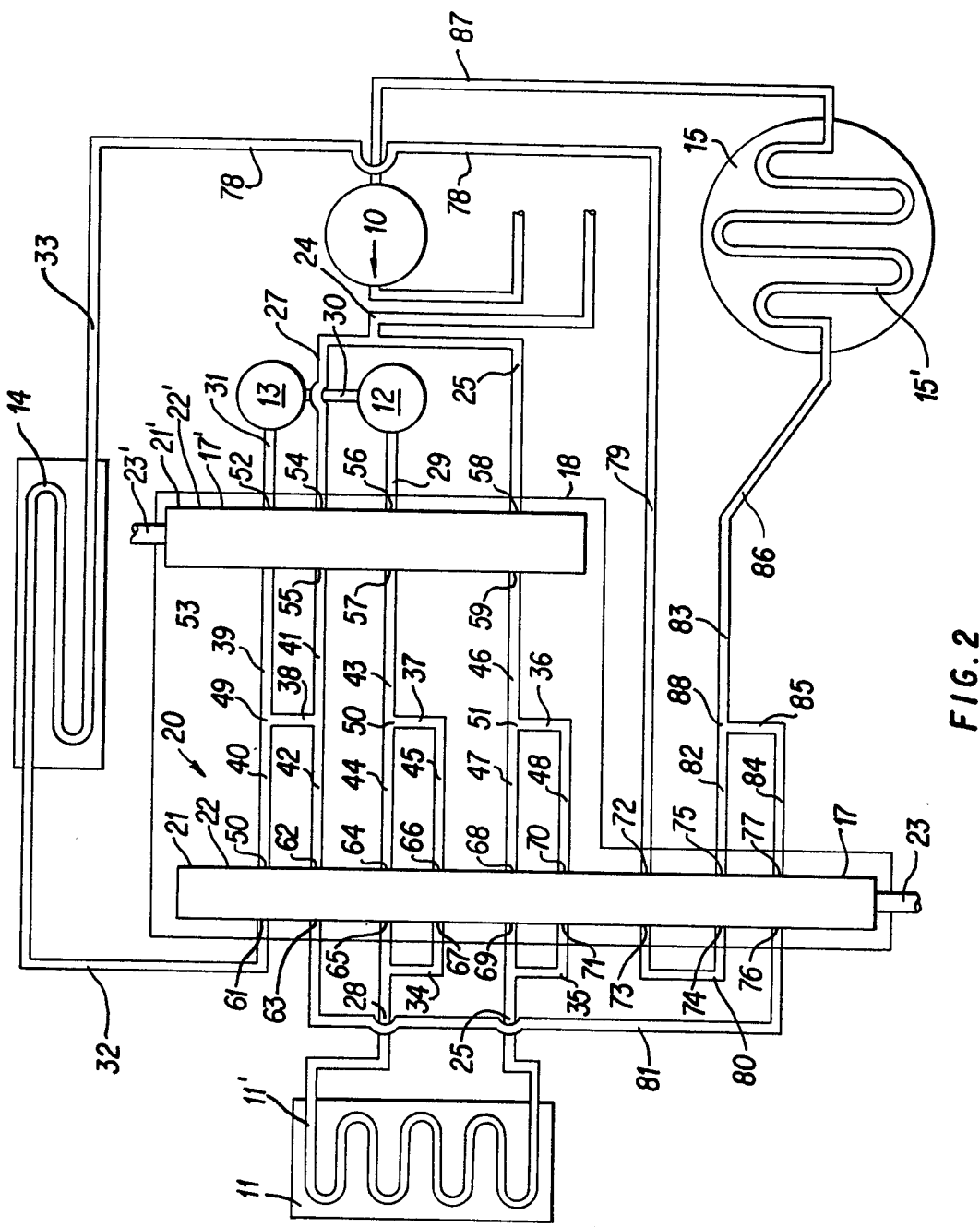
FIG. 2 is a similar view, in a non-portable water convection embodiment, including solar coils.
Figure 6:
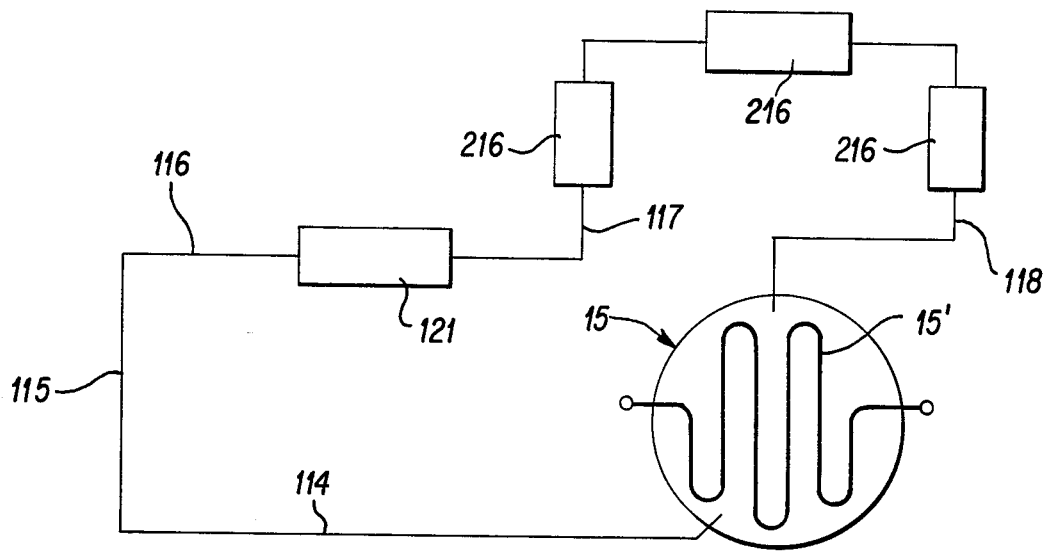
FIG. 6 is a schematic view of the storing and using means in a water convection embodiment.

FIGS. 2 and 10 illustrate the water convection heat/no-defrost/storage only cycle. Compressor 10 compresses a low pressure gas refrigerant into a high pressure gas and releases it into and through: pipes 24, in siamese position with pipes 78 and 87, then through pipe 25, port 58, piston recess 96 in piston 22' (in no-defrost position), ports 59 and 68, channels 46, 47 in manifold pipe 51, recess 91 in piston 22 (in heat position) port 69, pipe 26, refrigerant coil 11' in primary condenser heat exchanger 11, where the refrigerant transfers heat to the cold feed water to the domestic hot water tank 110, preheating the water before its entry into the hot water tank 110. Cooling of the refrigerant in heat exchanger 11 has now changed the state of the refrigerant to a high pressure liquid, which now exits coil 11' in heat exchanger 11 via pipe 28 into valve 20, where the refrigerant is directed through: port 65, recess 90 in piston 22, ports 64 and 57, channels 44 and 43, in manifold pipe 50, piston recess 95 in piston 22', port 56, exiting valve 20 through pipe 29. The refrigerant is directed through reservoir 12, pipe 30, and expansion valve 13 where it changes to a low pressure liquid, pipe 31, back into valve 20, passing through port 52, piston recess 94 in piston 22', port 53, channels 39 and 40 in manifold pipe 49, port 60, piston recess 89 in piston 22, port 61, and pipe 32 into solar coil 14, operating as an evaporator, absorbing solar and/or ambient heat, where the refrigerant changes state to a low pressure gas. The heat laden refrigerant leaves solar coil 14, through pipe 33. The hot refrigerant continues through pipes 78 in siamese position with pipes 24, 87, then into pipe 79, valve 20, port 72, recess 92 in piston 22, port 73 in manifold pipe 80, port 74, piston recess 93 in piston 22, port 75 in manifold pipe 88, channels 82 and 83, and pipe 86 into refrigerant coil 15' in storage tank heat exchanger 15, depositing the heat directly into storage.

Heat exchanger 16 has been eliminated in convection systems, and the system for using the heat generated remains inactive in this cycle, unless needed, then the storage using means may be activated by operating pump 121, which would pump the hot storage water from heat exchanger 15 through pipes 114-117, convectors 216, returning to heat exchanger 15 via pipe 118, continually heating the interior as described above. The using means previously outlined for convection systems are applicable. This cycle is basically somewhat similar in forced air or convection water systems. The refrigerant exits coil 15' in heat exchanger 15 via pipe 87 in siamese position with pipes 24 and 78, back to compressor 10, to repeat the cycle.

The function of this cycle is to generate heat from solar energy at peak sun periods, when building heating requirements are at a minimum, storing the heat for later use at night or on cloudy days. When a sufficient amount of heat has been stored, it may be used for some period of time, depending on the size of storage capacity, without operating the main generating system until storage heat is partially depleted.

As shown in FIGS. 1, 2, 4 (if storage tank used) 8, and 10, when there is no heat requirement, the main generating system may be deactivated or continue generation, storing the heat generated, without further using it. When there is a heat requirement, the main generating system may continue to operate or be deactivated, while the storage using means are in operation. Storage may thus be used in any of the heating and cooling cycles, forced air or water convection, with or without operation of the main generating system. By the same token, heating or cooling may be generated and stored, with or without using it. In the defrost cycles no heating or cooling is generated for interior use, but storage may be utilized.

FIGS. 2 and 11 illustrate the water convection heat/defrost/storage only cycle which performs the same function, defrosting solar coil 14, as in FIGS. 1, 4 and 9, except that FIG. 9 is a forced air combination cycle and FIG. 11 is a water convection storage only cycle. Both are a defrost cycle. Therefore, the refrigerant cycle is basically somewhat similar in FIG. 11 as in FIG. 9.

Compressor 10 compresses a low pressure gas into a high pressure gas, which is then released through pipe 24, in siamese position with pipes 78 and 87, into pipe 27, into valve 20 and through port 54, piston recess 94 in piston 22', port 55, channels 41, 38, 40, port 60 in manifold pipe 49, piston recess 89 in piston 22, port 61 and pipe 32, into solar coil 14, defrosting same, by virtue of the fact, as explained in the FIG. 9 description, the hot high pressure gas refrigerant travels directly from compressor 10 to solar coil 14, where ice and snow are eliminated by the heat in the refrigerant. Solar coil 14, in all defrost heat cycles operates as a condenser. The primary condenser heat exchanger 11, reservoir 12 and expansion valve 13 have been bypassed and isolated from the system. Due to the bypassing and isolation of these elements, the refrigerant is free to course throughout the system unimpeded, returning to compressor 10, to repeat the cycle. All functions of all cycles are controlled and directed by valve 20. The refrigerant leaves solar coil 14 through pipe 33 and is directed into pipe 78 in siamese position with pipes 24, 87, then into pipe 79. Cold water feed for domestic hot water was preheated in heat exchanger 11, in normal heat cycles, but in defrost cycles no preheating takes place in heat exchanger 11 because it is bypassed and isolated. The refrigerant passes through pipe 79, into valve 20, and passes through port 72, piston recess 92 in piston 22, port 73 in manifold pipe 80, port 74, piston recess 93 in piston 22, port 75, channels 82 and 83 in manifold pipe 88, pipe 86, into refrigerant coil 15' in heat exchanger 15, where some of the heat remaining in the refrigerant is transferred to the storage water.

In FIGS. 2 and 11, water convection, if the storage water in heat exchanger 15 is hotter than the refrigerant, then it would add heat to the refrigerant, helping it to more efficiently and quickly defrost the system. There is no evaporator operating in the defrost cycles. There is no need to be without heating or cooling during the defrost cycles of a water convection system. As previously explained, storage using means have been provided. The refrigerant exits refrigerant coil 15' in heat exchanger 15 via pipe 87, in siamese position with pipes 24 and 78, back to compressor 10, to repeat the cycle.

FIGS. 1, 4 and 12 illustrate the forced air cooling/no-defrost/cooling-storage combination cycle. Compressor 10 compresses a low pressure gas refrigerant into a high pressure gas, which is then released through pipes 24, in siamese position with pipes 78 and 87, then through pipe 25 into valve 20, where the refrigerant is directed through port 58, piston recess 96 in piston 22' (in no-defrost position), port 59, channels 46, 36, 48 in manifold pipe 51, port 70, piston recess 91 in piston 22 (in cooling position), port 71, channel 35, pipe 26, into refrigerant coil 11' in heat exchanger 11, where the refrigerant transfers heat to the domestic hot water feed, such cooled refrigerant changing state to a high pressure liquid, which exits coil 11' in heat exchanger 11 via pipe 28, channel 34, back into valve 20. It then passes through port 67, piston recess 90 in piston 22, port 66, channels 45, 37, 43 in manifold pipe 50, port 57, piston recess 95 in piston 22', port 56, pipe 29, reservoir 12, pipe 30 into expansion valve 13, where the refrigerant changes state to a low pressure liquid and re-enters valve 20 via pipe 31. It is then directed through port 52, piston recess 94 in piston 22', port 53, channels 39, 38 42 in manifold pipe 49, port 62, piston recess 89 in piston 22, port 63, manifold pipe 81, port 76, piston recess 93 in piston 22, port 77, channels 84, 85, 83 in manifold pipe 88, and pipe 86 to coil 16' in heat exchanger 16, operating as an evaporator, rapidly absorbing heat (changing state to a low pressure gas) from storage water coil 16" in heat exchanger 16 and from the surrounding air, cooling the air, which is then blown through the coils in heat exchanger 16, into ducts 226 by blower fan 120, in a forced air system.

In a water convection system, heat exchanger 16 is eliminated, in which case heat exchanger 15 becomes the evaporator, with the low pressure liquid refrigerant rapidly absorbing heat from the storage water in heat exchanger 15 (changing state to a low pressure gas), which heat, in conjunction with the heat of compression, is used in a repeat cycle to preheat the domestic hot water feed. Storage using means are as previously outlined. The refrigerant exits coil 16' in heat exchanger 16, directly entering coil 15' in heat exchanger 15, operating as a secondary evaporator in a forced air combination cycle, or operating as the primary evaporator in a water convection cooling cycle. The refrigerant exits coil 15' in heat exchanger 15 via pipe 87, in siamese position with pipes 24 and 78, going back to compressor 10 to repeat the cycle. The somewhat similar basic refrigeration cycle is used for convection or forced air systems. A glycol solution is used in the storage system to prevent a freezeup. The function of this cycle is to generate cooling, storing, and use of the cooling generated by the main generating system.

Solar energy, at present, plays no part in generating colling. The cooling cycles each employ completely different refrigerant cycles as do the heating cycles. There is no duplication of any of the cycles in use. In convection water systems, no outside air is cooled at the evaporator site, as it is in the forced air system. Only the storage water is made cold and pumped through the convectors 216, cooling the interior. The using means are identical to those employed in the forced air heat cycles. Blower 120 blows the cooled air into and through the ducts 226, cooling the interior, in a forced air system. As in the heat cycles, one may generate, store and use the cooling generated in unison, or generate and store in tandem, without using the cooling generated, or merely using the cooling from storage, with the main generating system shut down.

FIGS. 1, 4 and 13 illustrate the forced air cooling/defrost/cooling-storage combination cycle. Compressor 10 compresses a low pressure gas into a high pressure gas refrigerant, which is then released through pipe 24 in siamese position with pipes 78 and 87, then into pipe 27, entering valve 20, where it is directed through port 54, piston recess 94 in piston 22' (in the defrost position), port 55, channels 41 and 42 in manifold pipe 49, port 62, piston recess 89 in piston 22 (in cooling position), port 63, manifold pipe 81, port 76, piston recess 93 in piston 22, port 77, channels 84, 85, 83 in manifold pipe 88 and pipe 86, entering refrigerant coil 16' in heat exchanger 16, where the high pressure gas refrigerant defrosts the frost and ice buildups on and around heat exchanger 16, which had been operating as the evaporator until piston 22' was switched to the defrost position.

As in the heat defrost cycles, the primary condenser heat exchanger 11, reservoir 12 and expansion valve 13 have been bypassed and isolated from the system, and, tracing the course of the refrigerant in the cooling defrost cycles, it will be discovered that the hot high pressure gas refrigerant, as released from compressor 10, has been directed by valve 20, straight to the evaporator, in this case heat exchanger 16, where the heat in the refrigerant defrosts heat exchanger 16. In comparison, in the heat cycles, where solar coil 14 had been operating as the evaporator until piston 22' was moved to the defrost position, it will be noticed that valve 20 did indeed direct the hot high pressure gas refrigerant from compressor 10 directly to the evaporator, defrosting same, in that case, solar coil 14. As previously outlined, in all cooling cycles, solar coil 14 is bypassed and isolated from the system, as it would add heat to the refrigerant prematurely and would therefore be detrimental to the cooling process, as it would be operating as an undersirable evaporator.

There is no evaporator evident (inoperable as such, but still there) in the defrost cycles, since the expansion valve 13 has been bypassed and isolated from the system. The refrigerant exits coil 16' in heat exchanger 16, where it next passes through coil 15' in heat exchanger 15, exiting via pipe 87, in siamese position with pipes 24 and 78, back to compressor 10 to be recycled. The using means are as previously outlined in the description. The primary function of this cycle is to utilize the heat of compression to defrost the system, as in the heat defrost cycles.

FIGS. 2 and 14 illustrate the water convection cooling/no-defrost/storage only cycle. Compressor 10 compresses a low pressure gas refrigerant into a high pressure gas, which is then released through pipe 24, in siamese position with pipes 78 and 87, then through pipe 25 into valve 20, passing through: port 58, piston recess 96 in piston 22' (in no-defrost position), ports 59, 70, channels 46, 36, 48 in manifold pipe 51, piston recess 91 in piston 22 (in cooling position), port 71, channel 35, pipe 26, into refrigerant coil 11' in heat exchanger 11 primary condenser, where the heat in the refrigerant is transferred to the cold feed water on its way to the domestic hot water tank 110, from which it will be used at the faucets. The cold feed water is thus preheated, while the hot high pressure gas refrigerant, now cooled, changes state to a high pressure liquid and exits coil 11' in heat exchanger 11 through pipe 28, channel 34, back into valve 20. It is then directed through port 67, piston recess 90 in piston 22, ports 66 and 57, channels 45 37, 43 in manifold pipe 50, piston recess 95 in piston 22', port 56, pipe 29, reservoir 12, pipe 30 into and through expansion valve 13, where the high pressure liquid refrigerant changes to a low pressure liquid. It is then directed back into valve 20, through pipe 31, port 52, recess 94 in piston 22', port 53, channels 39, 38, 42 in manifold pipe 49, port 62, piston recess 89 in piston 22, port 63, manifold pipe 81, port 76, piston recess 93 in piston 22, port 77, channels 84, 85, 83 in manifold pipe 88, pipe 86 into refrigerant coil 15' in heat exchanger 15, now operating as the evaporator, where the low pressure liquid refrigerant rapidly absorbs the heat from the storage water in heat exchanger 15, which low pressure liquid refrigerant changes state to a low pressure gas. The heat, combined with the heat of compression, will be used in a repeat cycle to preheat the cold water feed to the domestic hot water tank 110. The refrigerant exits coil 15' in heat exchanger 15 via pipe 87, in siamese position with pipes 24 and 78, returning to compressor 10, to repeat the cycle. As in all cooling cycles, solar coil 14 is bypassed and isolated from the system, so as not to add heat to the refrigerant prematurely, as it would not be useful if too much heat were absorbed by the refrigerant prematurely. As in the storage only heat cycle, this cooling cycle is used when interior requirements are minimal, such as at night, but the need is there to continue to build up the storage for use during the hot days. Storage using means are identical for all water convection systems only, and identical for all forced air systems only, not the same for both. The function of this cycle is to generate and store cooling for later use, with or without using at the time of generation.

FIGS. 2 and 15 illustrate the water convection cooling/defrost/storage only cycle. Compressor 10 compresses a low pressure gas refrigerant into a high pressure hot gas, which is then released through pipe 24, in siamese position with pipes 78 and 87, then through pipe 27 into valve 20. It is then directed through port 54, piston recess 94 in piston 22' (in defrost position), port 55, channels 41, 42 in manifold pipe 49, port 62, piston recess 89 in piston 22 (in cooling position), port 63, manifold pipe 81, port 76, piston recess 93 in piston 22, port 77, channels 84, 85, 83, in manifold pipe 88, pipe 86 into refrigerant coil 15' in heat exchanger 15, where the hot high pressure gas refrigerant transfers the heat to the storage water in heat exchanger 15, preventing or eliminating a freeze-up if the glycol solution is too weak, as one function. This cycle can also be used to preheat the cold storage water prior to switching to the heat cycles. The refrigerant exits coil 15' in heat exchanger 15 via pipe 87 in siamese position with pipes 24 and 78, returning back to compressor 10, to repeat the cycle. Solar coil 14 is bypassed and isolated from the system for reasons previously explained in the description of FIG. 13. Heat exchanger 11, reservoir 12 and expansion valve 13 are also bypassed and isolated from the system in this cycle, for the same reasons explained in the description of FIGS. 9, 11, 13 and 15, the defrost cycles. Heat exchanger 16 is eliminated in convection systems. This cycle is a normal cycle, which has been switched from a no-defrost to defrost position by pushing in piston 22'.

As set forth above, FIGS. 1, 5, 7, 8, 9, 12, 13, 16, 17 and 18 illustrate a complete apparatus, in a forced air embodiment. FIGS. 2, 6, 7, 10, 11, 14, 15, 16, 17 and 18 illustrate a complete apparatus in a convection water embodiment. Identical storing means and identical generating means are provided for forced air and convection systems. Identical using means are provided for all forced air cycles for heating and cooling. All water convection cycles for heating and cooling have identical using means, which differ from forced air using means.

Four cooling cycles and four heating cycles are provided in apparatus 19, four forced air (one each for normal heat, heat defrost, normal cooling, and cooling defrost) and for water convection (one each for normal heat, heat defrost, normal cooling, and cooling defrost) Of the eight represented in FIGS. 8–15, only four cycles can be used in each system. Of the eight individual cycles not more than four each are applicable to either forced air or water convection system. A defrost cycle is provided to rid the apparatus of unwanted frost, ice or snow, heating or cooling, forced air or water convection systems.

Figure 7:
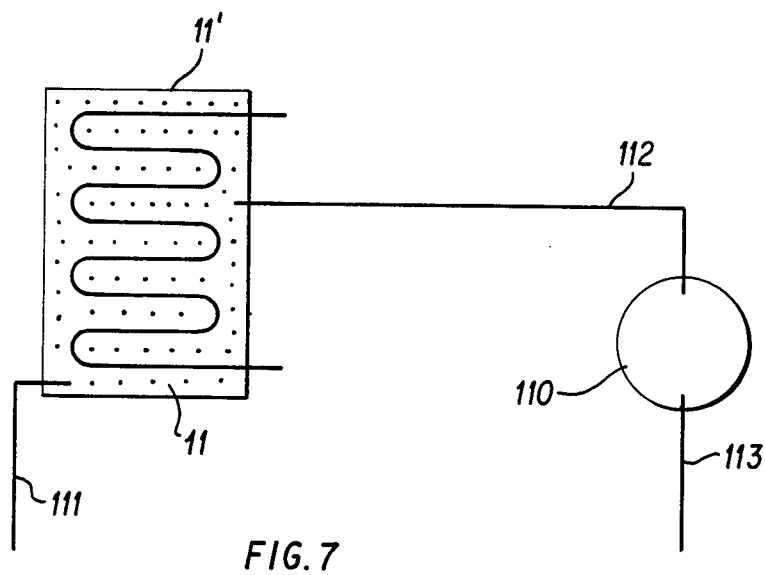
FIG. 7 is a schematic view of the means for preheating domestic hot water in both forced air and water convection embodiments.

In heating or cooling cycles, forced air or water convection, means are provided for generating, storing and using the heating and cooling generated, including solar heat. In heating or cooling cycles, forced air or water convection, means are provided for preheating the cold feed water to the domestic hot water tank 110, for use at faucets, as shown in FIG. 7. The apparatus may be used as a portable and a non-portable apparatus (FIGS. 1, 2, 4, and 8–15).

A variable directing valve mechanism, referred to as valve 20, is provided for directing the refrigerant through the various cycles, varying the timing and location of the refrigerant's engagement with various elements of the condition changing system, a labyrinthine structure with cylinders and pistons. A modified refrigeration system is provided, containing a multiplicity of true cycles. The apparatus is capable of generating, storing and using in unison, or generating and storing without using, or just using without generating or storing. It is capable of storing heat when in the heating cycles, and storing cold when in the cooling cycles, in the same storage tank, as an automatic process. It can bypass and isolate various components of the modified refrigeration system when not needed, or when they might interfere with or obstruct a desired function. It is capable of varying the functions of various components of the modified refrigeration system and of varying the course of the refrigerant.

It modifies the refrigeration system by permanently removing the reservoir 12 and expansion valve 13 from the system and permanently appending them to the variable directing valve 20, which valve 20 is then interconnected with the modified refrigeration system to form a complete hermaphrodite system. It maintains the direction of flow of the refrigerant in one general direction, never reversing it for any reason, not even to defrost.

Many variations are possible of the generating, storing and using means, and also of the variable directing valve mechanism. It uses renewable, reusable energy sources, which are non-polluting.

As further shown above, in the heating cycles, except defrost, solar coil 14 operates as the evaporator. In the cooling cycles, except defrost, either heat exchanger 15 or 16 can operate as the primary evaporator. In forced air systems, both heat exchangers 15 and 16 are necessary, with heat exchanger 16 as the primary evaporator when generating cooling, and is also the means for delivering the heating and cooling to the interior, while heat exchanger 15 stores heat and cold and generates cooling.

In water convection systems, heat exchanger 16 is unnecessary and is omitted, unless conversion has been made from forced air to water convection, in which case the blower and ducts are removed and heat exchanger 16 is fully enclosed. If heat exchanger 16 is omitted, then heat exchanger 15 operates as the evaporator. All combination cycles apply to a forced air system, whereas the storage only cycles apply to the water convection system. The defrost cycles apply to both systems, whether heating or cooling. The same variable directing valve mechanism is used for forced air or water convection systems.

In the defrost cycles, heating or cooling, forced air or water convection, apparatus 19 operates as only large condenser with no evaporator in operation in the system, since expansion valve 13 has been bypassed and isolated from the system. Bypassing and isolating various elements of the modified refrigeration system is a capability incorporated within valve 20 and the defrost mechanism within valve 20. These bypassing and isolating features are necessary where certain functions do not require use of these elements, or certain elements might be detrimental to the successful outcome of certain functions. All elements are necessary to the successful outcome of the heating cycles in forced air or convection systems, except the defrost cycles.

In the heating or cooling cycles, forced air or water convection systems, valve 20 has, incorporated within itself, the capability of bypassing and isolating elements unwanted and detrimental to a successful heat and cool defrost, and normal cool function. In the heating defrost cycles, primary condenser heat exchanger 11, reservoir 12 and expansion valve 13 are bypassed and isolated, while valve 20 directs the hot, high pressure gas refrigerant from compressor 10 directly to solar coil 14, defrosting same. If heat exchanger 11 were allowed to remain in the system, the refrigerant would be cooled prematurely and, as a result, would not efficiently effect defrosting. If expansion valve 13 were to remain active in the system, solar coil 14 would be operating as the evaporator, as in a normal heat cycle, so no defrosting could take place. Reservoir 12 would have no impact either way, but, being in series with valve 20 and expansion valve 13, is automatically bypassed and isolated. As a result of the bypassing and isolation of the primary condenser heat exchanger 11, reservoir 12 and expansion valve 13, solar coil 14 and the entire system now operate as one large condenser, with the hot, high pressure gas refrigerant coursing throughout the system unimpeded, defrosting same and returning to compressor 10, to repeat the cycle. Thus defrosting is accomplished and no evaporator is evident in the defrost cycles, still there nonetheless, but inoperable as such.

Besides using the heat of compression in the wintertime, to defrost solar coil 14, ridding it of ice and snow, the already heated storage water in heat exchanger 15 would add more heat to the refrigerant, thus more efficiently defrosting the apparatus. This defrost capability ensures continual generation of heat when heat is needed most, even in a snowstorm, night or day in any kind of weather.

In the cooling cycles, forced air or water convection, solar coil 14 is bypassed and isolated from the system by valve 20, as these elements would be detrimental to the cooling cycles because it would prematurely add unwanted heat to the refrigerant, thereby destroying the function in the cooling cycles, of evaporator, heat exchanger 15 or 16, as solar coil 14 would be operating as an undesirable evaporator.

In the cooling cycles, forced air or water convection, besides the isolation and bypassing of solar coil 14 as described above, to defrost, as in the heat defrost cycles, the primary condenser heat exchanger 11, reservoir 12 and expansion valve 13 are bypassed and isolated by valve 20, which now directs the refrigerant, a hot, high pressure gas, directly from compressor 10 to the evaporator heat exchanger 15 or 16, in this case, defrosting same. The refrigerant, coursing throughout the system unimpeded, returns to compressor 10, to repeat the cycle. As in the heat defrost cycles, the cooling defrost cycles make the apparatus one large condenser, with no evaporator evident. In forced air cooling, the evaporator is heat exchanger 16; in water convection cooling, the evaporator is heat exchanger 15.

In the storage only cycles, valve 20 directs the refrigerant straight from expansion valve 13 into storage tank heat exchanger 15, making it the evaporator in the cooling cycles, and a condenser in the heating cycles when valve 20 directs the refrigerant from expansion valve 13 directly to solar coil 14, making it the evaporator.

In the portable and non-portable apparatuses, all functions are identical. Heat exchanger 11 operates as a common primary condenser in the heating and cooling cycles. Solar coil 14 operates as the evaporator in the heating cycles. Heat exchanger 15 if used, or 16, as heretofore explained, operates as the evaporator in the cooling cycles. No evaporator is evident in the defrost heating or cooling cycles.

In the heating cycles, the modified refrigeration system is comprised of compressor 10, primary condenser heat exchanger 11, reservoir 12, expansion valve 13 and the evaporator solar coil 14, which elements combined form a basic refrigeration system. Heat exchanger 16 is only the delivery vehicle in the forced air heat cycles, enabling use of the heating generated at solar coil 14. Heat exchanger 15 is the means for storing the heat generated by solar coil 14, in forced air or water convection systems. Heat exchanger 16 is eliminated in water convection systems and heat exchanger 15, pump 121 and the convectors 216 provide for delivery of the heat generated at solar coil 14.

In the cooling cycles, the modified refrigeration system is comprised of the same compressor 10, the same primary condenser heat exchanger 11, the same reservoir 12, the same expansion valve 13 and evaporator heat exchanger 15 or 16, which elements form a basic refrigeration system, with the only change in the basic refrigeration system being the evaporator, which was solar coil 14 in the heat cycles and is now heat exchanger 16 in the forced air cooling cycles. Heat exchanger 16 is eliminated in a convection system, so heat exchanger 15 is the evaporator, and the delivery and using means for the cooling generated at heat exchanger 15 or 16 is identical to that in the heating cycles, as described above. Solar coil 14 is bypassed and isolated in the cooling cycles.

The refrigerant variable directing mechanism enables changes in the course and pressure of the refrigerant, in conjunction with solar energy, to be used as the primary source for heating and cooling. Such refrigerant is a reusable, efficient, economical and non-polluting energy source, in conjunction with the use of solar energy. The generating and storage systems enable use of changes in the state, temperature and pressure of the refrigerant to generate further heating and cooling for other uses, in an efficient and economical manner. The defrosting system enables defrosting of the apparatus for efficient and economical operation on a continual basis.

In the portable apparatus illustrated in FIG. 4, the same valve 20 is used and the system for generating, storing and using are substantially the same as in the non-portable apparatus shown in FIGS. 1, 2, 8-15. A sealing flap 130, inside and outside louvers 131 and 131' are provided, as illustrated in FIGS. 3 and 4. The sealing flap 130 is mounted pivotally on heat exchanger 11 to seal off either the inside or outside face of heat exchanger 11, depending on the mode of operation of the system. Heat exchanger 11 is located centrally between the louvers 131 and 131'.

In the forced air cooling cycle, flap 130 seals off the inside face of heat exchanger 11 the primary condenser, exposing it to the exterior where fan 132 blows the heat into the outside surrounding air. If the sealing flap 130 were not in place, the heat in heat exchanger 11 would intermix with the cooled air generated at heat exchanger 16, and fan 120 and fan 132 would be operating against each other, defeating the purpose. Louver 131' provides a continual fresh supply of outside air to fan 132, while louver 131 provides continual fresh supply of previously cooled interior air to fan 120. No outside air is used for heating or cooling the interior. Recirculated interior air, which has previously been conditioned, is used for heating or cooling, and this recirculation method increases the efficiency and economy of use of the apparatus.

Heat exchanger 16, operating as the evaporator, absorbs heat from the inside wall W, cooling the surrounding air, which cooled air, fan 120 blows throughout the interior or through ducts. Heat exchanger 16 is located on the inside of wall W. Solar coil 14 is located on the outside wall W, and fans 120 and 132 are both used in the forced air, without storage, mode of operation, as shown in FIG. 4. By omitting heat exchanger 15 (storage tank shown in FIGS. 1, 2, 8, 9, 12 and 13) and domestic water preheating capability, the non-portable apparatus could operate identically to the FIG. 4 portable apparatus, making sealing flap 130 and fan 132 a necessity to cool heat exchanger 11, the main condenser. FIGS. 1, 2 and 8-15 all show the apparatus with storage, with no sealing flap 130 or fan 132 needed. FIG. 4 shows the system without storage, and flap 130 and fan 132 are needed. All systems may operate with or without storage, with or without preheating domestic hot water. With storage and preheating the cold feed for domestic hot water capability, exactly as outlined for the non-portable apparatus, fan 132 would be unnecessary.

The portable and non-portable apparatuses may be operated with or without the storing systems. With the storing systems, either apparatus operates more efficiently and economically, since operating time is considerably less. Without the storing systems, only forced air systems are possible, but with storage, forced air or convection hot/cold water systems can be used in the same fashion as in the non-portable apparatus.

The fans do not operate in the defrost cycles, as the purpose would be defeated by blowing cold air over the coils, when heat is needed to effect defrosting. In the heating cycles, fan 120 is operated while fan 132 is not. The reason for this is that fan 120 is needed to blow the heat into the interior, and if fan 132 was activated, it would be blowing cold air on solar coil 14, operating as an evaporator, absorbing solar heat, and would defeat the unit's purpose. In the cooling cycles, fans 120 and 132 are both in operation. The reasons for this is that fan 120 is required to blow the cold air into the interior, while fan 132 is required to blow the heat in the refrigerant in primary condenser heat exchanger 11 to the exterior, to cool the refrigerant. In the cooling cycles, solar coil 14 is bypassed and isolated, so fan 132 has no effect on solar coil 14 as it would have in solar heat cycles.

In the heating cycles, sealing flap 130 seals off the exterior face of primary condenser heat exchanger 11, exposing it to the interior of wall W in order to concentrate the heat in heat exchanger 11 with the solar heat in heat exchanger 16 for the purpose of obtaining additional heat for the interior. All other operations are the same as those described in the heating cycles in the non-portable apparatus, FIGS. 8-11.

Solar coil 14, operating as an evaporator, absorbs solar and/or ambient heat, which is directed by valve 20 through the pipes into heat exchanger 16. Heat exchangers 11 and 16 are exposed to the interior, with louver 131 located under the inside face of heat exchanger 11, and fan 120 is located between them, both operating as condensers. Fan 120 blows a fresh supply of preheated interior air, acquired through louver 131, around heat exchanger 11, cooling heat exchanger 11 and then blowing this heat through heat exchanger 16, which contains the solar heat absorbed by solar coil 14 heating the interior.

In the cooling cycles, sealing flap 13 seals off the interior face of heat exchanger 11 exposing it to the exterior of wall W. Fan 132 blows the heat in heat exchanger 11 to the outside air, and fan 120 blows cooled air into the interior, with heat exchanger 16 operating as an evaporator. Fan 120 blows a fresh supply of precooled interior air, acquired through louver 131, through heat exchanger 16 further cooling the interior. All other operations are identical to those described above in the cooling cycles in the non-portable apparatus, as illustrated in FIGS. 1, 2, 3, 4, and 12-15.

The aforementioned means for recirculating previously conditioned interior air is a continuous process in all heating and cooling cycles, except for the defrost cycles.

In the defrost cycles, the sealing flap may be in any position, with no fans operating. In any cycle, heating or cooling, there is no change in the positioning of the apparatus, as illustrated in FIGS. 1, 2 and 4, or in any mode of operation.

If the storage system is used with the apparatus in FIG. 4, then a convection heat/cold water system or a forced air system, requiring the same basic changes as in the apparatuses in FIGS. 1 and 2, may be used. FIG. 2 is a convection/water system and FIG. 1 is a forced air system, both employing the use of a storage system. The embodiment shown in FIG. 1, without storage, would operate, in the non-portable embodiment, basically the same as the portable apparatus shown in FIG. 4. The embodiment shown in FIG. 2 would not operate without storage, as it is a convection/water system.

It is contemplated that numerous variations may be made from the preferred embodiment described above, without departing from the spirit and scope of the present invention. Accordingly, it is intended that this patent be limited only by the scope of the claims.

I claim:

1. A hermaphrodite modified refrigeration apparatus for enabling selective generation, storage, and use of heating or cooling, for heating or cooling a medium, and for enabling defrosting of the apparatus, integrated to generate heating or cooling for use as desired by the user, adapted to subject the medium to a refrigerant, for heating or cooling the medium or for defrosting, by transferring heat from or to the refrigerant, which refrigerant is conditioned in the apparatus in one of a plurality of true refrigeration cycles each generated by non-reversible flow of the refrigerant through selected elements of the apparatus, and further adapted to actively acquire, store, and use solar energy, for generating solar heating, comprising:

(a) means for conditioning the refrigerant, adapted to generate non-reversible flow of, exchange heat with, and transform the phase, temperature and pressure of, the refrigerant, to enable the medium to be subjected to the conditioned refrigerant for heating or cooling of the medium, including a plurality of elements, which include an element for absorbing, storing, and using heat derived from solar energy, adapted to heat the refrigerant, and further adapted to be positioned so as to receive the heat of solar energy;

(b) means for enabling selective directly, and varying of the sequence, of non-reversible flow of the refrigerant through selected elements, bypassing and isolating non-selected elements, of the means for conditioning the refrigerant, adapted to generate a selected one of the plurality of true refrigeration cycles to enable operation of the apparatus in the selected refrigeration cycle for conditioning the refrigerant, to selectively generate, store, and use heating or cooling of the medium or to defrost the apparatus; and (c) means for interconnecting the means for enabling selective directing of non-reversible flow of the refrigerant, and the plurality of elements of the means for conditioning the refrigerant.

2. An apparatus as in claim 1, in which elements of the means for conditioning the refrigerant further comprises a compressor, adapted to generate non-reversible flow of the refrigerant by compression, and to transform the pressure of the refrigerant from low pressure gas to high pressure gas, a primary condenser, adapted to transfer heat from the refrigerant by condensation, to decrease the temperature of the refrigerant, so as to transform the phase of the refrigerant from a gas to a liquid, and a plurality of heat exchangers, each adapted, responsive to operation of the means for enabling selective directing and varying of the sequence of non-reversible flow of the refrigerant, to transpose functions from a condenser to an evaporator or from an evaporator to a condenser, to transfer heat to or from the refrigerant, to increase the temperature of the refrigerant so as to transform the phase of the refrigerant from a liquid to a gas, to operate as an evaporator, or to decrease the temperature so as to transform the phase of the refrigerant from a gas to a liquid, to operate as a condenser.

3. An apparatus as in claim 1, in which the means for enabling selective directing of non-reversible flow of the refrigerant comprise a variable directing valve mechanism, which includes a valve body, including side walls, and having a cylinder formed therein, the cylinder including a wall having a plurality of ports formed at opposed locations in the cylinder wall, and formed in the valve body side walls, and a plurality of channels and sub-channels interconnecting the plurality of ports, with some of which the plurality of ports in the cylinder wall are in registry, a piston, movably positioned in the cylinder in the valve body, including means for blocking selected ones, and opening others, of the plurality of ports in the wall of the cylinder, alignable with the plurality of channels and sub-channels in the side walls of the valve body, for selectively directly the non-reversible flow of refrigerant through one of a plurality of courses through the valve body, each course being defined by a path through the cylinder and selected ones of the plurality of ports, channels, and sub-channels in the valve body, and the means in the piston for blocking selected ones and opening others of the plurality of ports in the wall of the cylinder, each course being associated with one of the plurality of true refrigeration cycles, and means for enabling selective movement of the piston in the cylinder, in which the means for conditioning the refrigerant further comprises an expansion valve, adapted to transform the pressure of the refrigerant, by expansion, from high pressure liquid to low pressure liquid, connected, by the interconnecting means, to the means for enabling selective directing of non-reversible flow of the refrigerant, and indirecty connected to the other elements of the means for conditioning the refrigerant.

4. An apparatus as in claim 1, further comprising means for storing and using the heating or cooling of the medium selectively generated by the means for conditioning the refrigerant and the means for enabling selective directing of non-reversible flow of the refrigerant.

5. An apparatus as in claim 1, further adapted to generate further heating or cooling, after operating the refrigerant conditioning means, without further operating the refrigerant conditioning means.

6. An apparatus as in claim 2, in which a plurality of the heat exchangers are further adapted to transfer heat to or from a further medium, to increase or decrease the temperature of the further medium, and to store the further medium or the heated or cooled further medium.

7. An apparatus as in claim 2, in which one of the plurality of heat exchangers comprises a solar coil.

8. An apparatus as in claim 3, further comprising a reservoir, adapted to retain a supply of liquid refrigerant for the expansion valve, connected, by the interconnecting means, to the expansion valve and the means for enabling selective directing of non-reversible flow of the refrigerant, and indirectly connected to the other elements of the means for conditioning the refrigerant.

9. An apparatus as in claim 3, in which the means for blocking selected ones, and opening others, of the plurality of ports in the wall of the cylinder comprises a plurality of blocking portions and a plurality of recessed portions, in the piston, adapted to selectively interface with the plurality of ports in the wall of the cylinder such that the blocking portions seal off, and the recessed portions open, selected ones of the plurality of ports in the wall of the cylinder, and channels and sub-channels in registry therewith.

10. An apparatus as in claim 3, in which the means for enabling selective movement of the piston in the cylinder are adapted to enable reciprocal movement of the piston, for selectively directing the non-reversible flow of refrigerant through the valve body.

11. An apparatus as in claim 3, further comprising a second cylinder formed in the valve body, including a cylinder wall, having a plurality of second ports, formed in the second cylinder wall, at opposed locations therein, a plurality of second channels and second sub-channels interconnecting ports on the cylinder wall, with some of which the plurality of second ports in the second cylinder wall are in registry, second ports in the second cylinder wall, and ports on the outer valve body side wall, and a second piston, movably positioned in the second cylinder in the valve body, including means for blocking selected ones, and opening others of the plurality of ports in the wall of the second cylinder, alignable with the plurality of channels and sub-channels in the side wall of the valve body, for selectively directing the non-reversible flow of refrigerant through the valve body, and second means for enabling selective reciprocal movement of the second piston in the second cylinder.

12. An apparatus as in claim 3, in which the interconnecting means are connected to the valve body so as to align with the channels and sub-channels on the outer side walls of the valve body.

13. An apparatus as in claim 6, further comprising means for delivering and using the stored further medium.

14. An apparatus as in claim 11, in which the means for blocking selected ones, and opening others, of the plurality of ports in the wall of the cylinder comprise a plurality of blocking portions and a plurality of recessed portions, in the piston, adapted to be selectively registrable with the plurality of ports in the wall of the cylinder and the channels and sub-channels in registry with the ports such that the blocking portions block off, and the recessed portions open, selected ones of the plurality of ports in the wall of the cylinder, and the means for blocking selected ones, and opening others, of the plurality of ports in the wall of the second cylinder comprise a plurality of blocking portions and a plurality of recessed portions, in the second piston, adapted to be selectively registrable with the plurality of ports in the wall of the second cylinder such that the blocking portions block off, and the recessed portions open, selected ones of the plurality of ports in the wall of the second cylinder, and the channels and sub-channels in registry with the ports.

15. An apparatus as in claim 11, in which the means for enabling selective movement of the piston in the cylinder, and the second means for enabling selective movement of the second piston in the second cylinder are adapted to enable reciprocal movement of the piston in the cylinder and of the second piston in the second cylinder.

16. An apparatus as in claim 11, in which the cylinder and second cylinder are disposed in spaced parallel relation to each other in the valve body.

* * * * *